(12) United States Patent
Takatani et al.

(10) Patent No.: US 8,269,993 B2
(45) Date of Patent: Sep. 18, 2012

(54) DOCUMENT READING APPARATUS AND IMAGE FORMING APPARATUS INCLUDING DISPLAY PORTION HAVING AREA SENSOR

(75) Inventors: Hiroshi Takatani, Yamato-Takada (JP); Kazunori Soda, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 823 days.

(21) Appl. No.: 12/355,166

(22) Filed: Jan. 16, 2009

(65) Prior Publication Data

US 2009/0190152 A1 Jul. 30, 2009

(30) Foreign Application Priority Data

Jan. 29, 2008 (JP) ................................. 2008-017558

(51) Int. Cl.
*G06F 3/12* (2006.01)

(52) U.S. Cl. ....... 358/1.13; 345/158; 345/173; 345/698; 345/699; 715/764; 715/799

(58) Field of Classification Search ................. 358/1.13, 358/1.2, 449, 462, 488, 528; 399/81; 345/158, 345/173, 698, 699; 715/764, 799
See application file for complete search history.

(56) References Cited

U.S. PATENT DOCUMENTS

| 5,742,279 | A | 4/1998 | Yamamoto et al. | |
| 6,285,842 | B1* | 9/2001 | Katamoto et al. | 399/81 |
| 2006/0132821 | A1* | 6/2006 | Nonaka et al. | 358/1.13 |
| 2007/0025752 | A1* | 2/2007 | Maeda et al. | 399/81 |

FOREIGN PATENT DOCUMENTS

| JP | 8-107495 | 4/1996 |
| JP | 2001-350304 | 12/2001 |
| JP | 2006-179977 | 7/2006 |
| JP | 2007-259282 | 10/2007 |

* cited by examiner

*Primary Examiner* — Benny Q Tieu
*Assistant Examiner* — Juan Guillermety
(74) *Attorney, Agent, or Firm* — Renner, Otto, Boisselle & Sklar, LLP

(57) ABSTRACT

In an apparatus having a document reading portion for reading an image of a document on a document platen, by reading an image of a document on a display screen using an area sensor, it's not necessary to set a document for reading on the platen so that the document is prevented from being left behind, and even when a document on the platen and the document sticks out of the platen to extend over the screen, it is possible to prevent the document on the screen is erroneously read. When detecting a document on the platen and detecting that an object on the screen does not have a standard size by the area sensor, a control portion of the apparatus controls so that the document reading portion reads the image of the document on the platen and the area sensor is prohibited from reading the image.

8 Claims, 16 Drawing Sheets

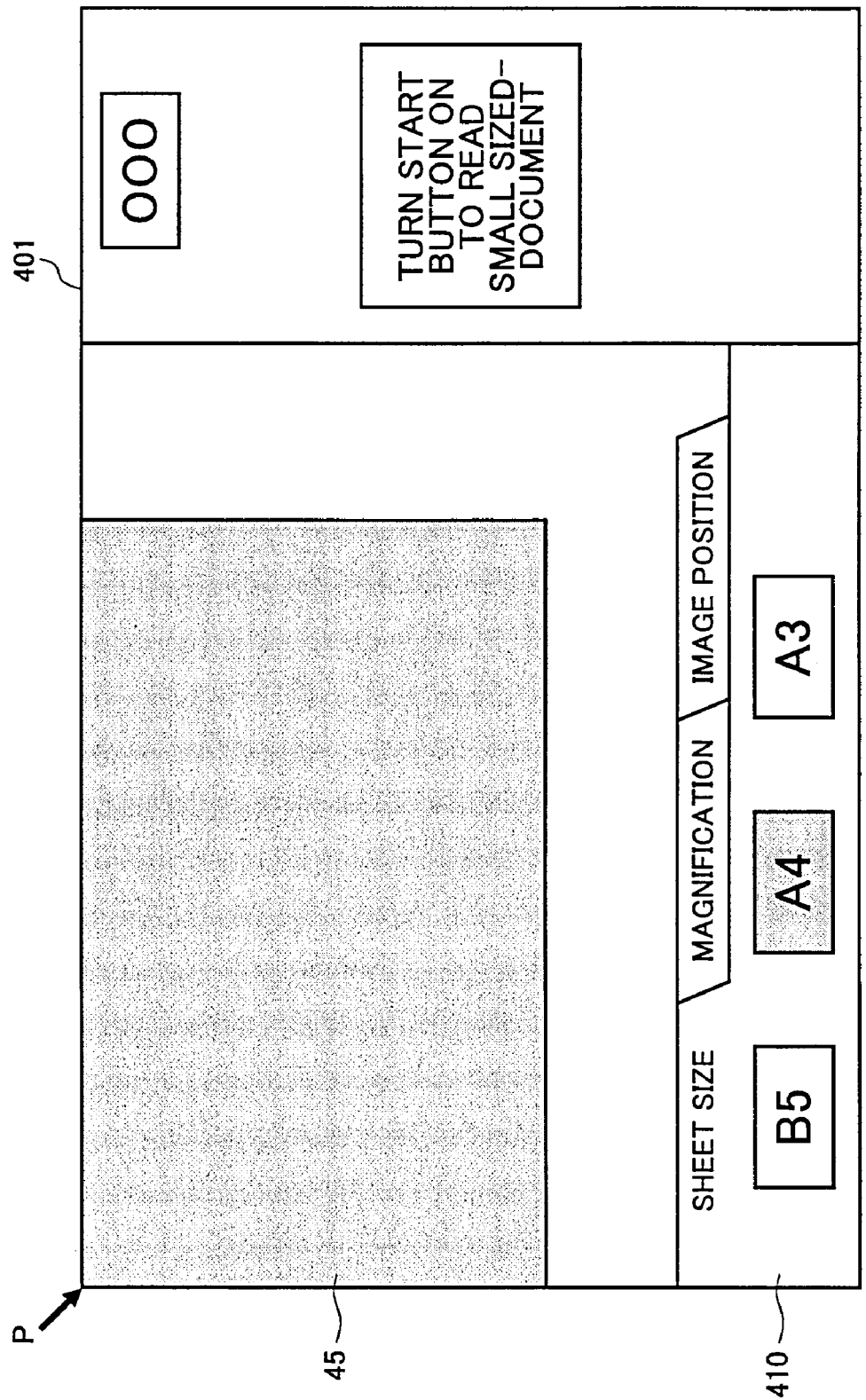

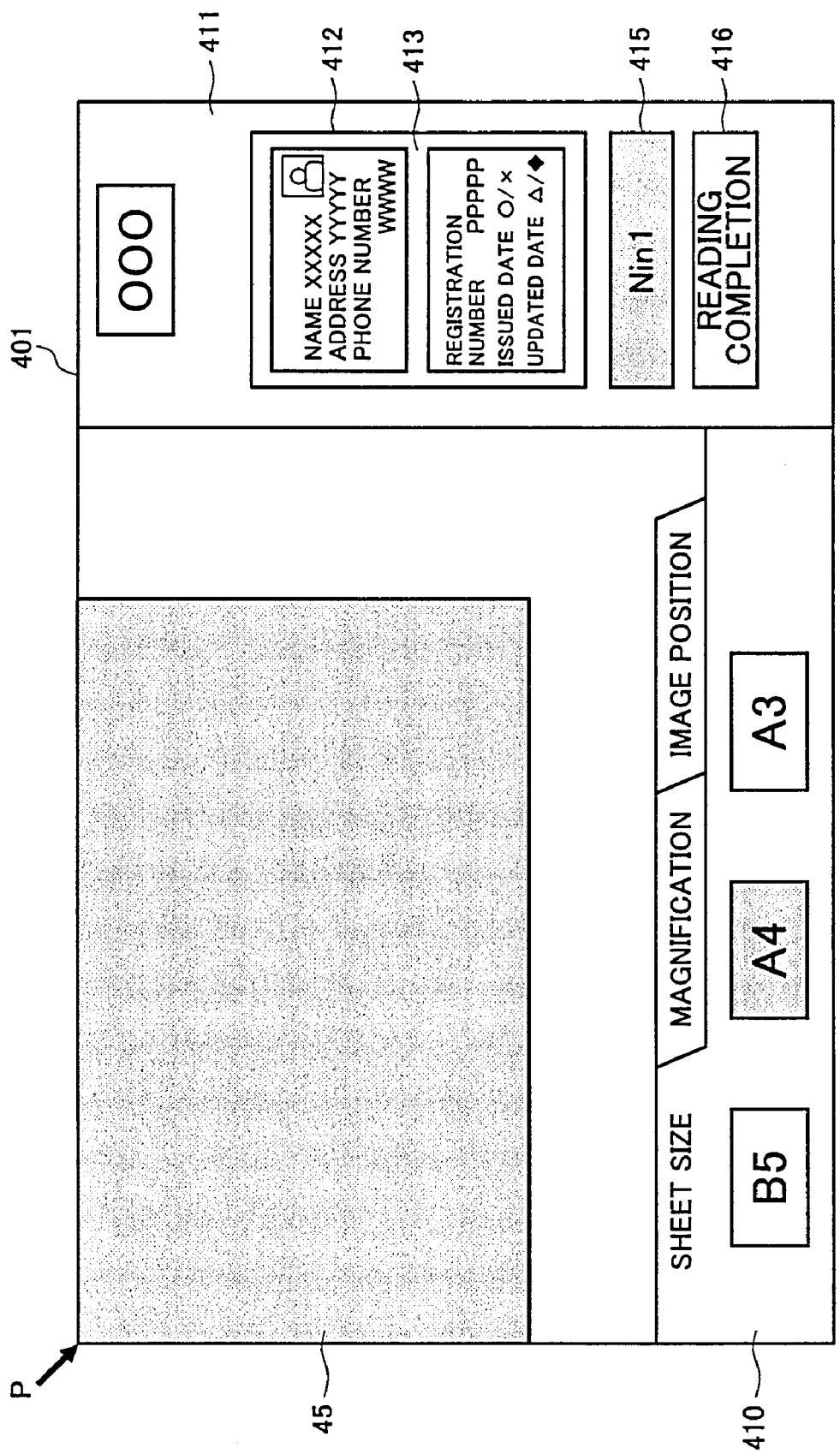

DOCUMENT READING APPARATUS AND IMAGE FORMING APPARATUS INCLUDING DISPLAY PORTION HAVING AREA SENSOR

CROSS-NOTING PARAGRAPH

This Non-provisional application claims priority under 35 U.S.C. §119(a) on Patent Application No. 2008-017558 filed in JAPAN on Jan. 29, 2008, the entire contents of which are hereby incorporated herein by reference.

FIELD OF THE INVENTION

The present invention relates to a document reading apparatus and an image forming apparatus, and relates to a document reading apparatus having a function for reading a document on a display screen such as a liquid crystal panel, and an image forming apparatus including the document reading apparatus.

BACKGROUND OF THE INVENTION

In recent years, a digital multifunctional peripheral (MFP) having a plurality of functions including a copy function, a printer function, a facsimile function, and a scanner function has become popular. The MFP is provided with a large document platen so that documents having up to A3 size can be read normally. When performing copy with this MFP, a user closes a document cover (document pressing plate) with a document set on the document platen to execute scanning.

At this time, the document cover is closed to hide the document so that the user can not visually view the document. Thus, the user can leave the document set on the document platen behind carelessly after obtaining a copy. Especially, when copying a relatively small-sized document, such as a driver's license, a name card and an L-sized picture, the document is often left behind without noticing the existence thereof.

Meanwhile, an input display in which a relatively small-sized liquid crystal panel has a function for reading a document placed on a screen in addition to a conventional display function for displaying image data on the screen attracts attention (for example, see Japanese Laid-Open Patent Publication No. 2006-179977). When this input display is mounted to a portable terminal such as a portable information terminal (PDA), a card-sized document can be easily read and information in the document can easily be obtained. Note that, as the input display an area sensor is generally employed. The area sensor captures an image of an object by a photoelectric conversion element provided on a plane as electric signal and therefore does not need to scan the photoelectric conversion element, that is different from a line sensor, and does not need a motor and the like for scanning.

An operation portion of the MFP is generally provided with a liquid crystal display portion with a touch panel in many cases and this portion is directly operated by a user, to which each user's attention is most likely to be directed. When the above-mentioned reading function is provided in the liquid crystal display portion, it is possible to read and capture a relatively small-sized document such as a driver's license. By employing such a structure, the convenience is improved as follows. First, it is not necessary to perform an operation of setting a document on a document platen, closing a document cover, and opening the document cover after reading the document image, thus making it possible to easily read the document image. Secondly, user's attention is most likely to be directed to the liquid crystal display portion, thus making it possible to prevent a document from being left behind.

However, the conventional art including the technique described in Japanese Laid-Open Patent Publication No. 2006-179977 does not assume the structure where the input display is incorporated in the MFP, resulting that the conventional MFP can not read a document on a liquid crystal display portion.

Furthermore, when the structure where the liquid crystal display portion of the MFP performs document reading is employed, although a user places a document on a document platen, the document can stick out from the document platen to extend over the liquid crystal display portion. In such a case, the area sensor of the liquid crystal display portion erroneously determines that the document is placed so that the area sensor reads an unnecessary document image.

SUMMARY OF THE INVENTION

An object of the present invention is to provide a document reading apparatus for reading an image of a document placed on a document platen and an image forming apparatus including the document reading apparatus, wherein it is not necessary that a reading target document is placed on the document platen and the document is therefore prevented from being left behind by reading an image of a document on a display screen of a display portion using an area sensor, in addition to reading an image on the document platen, as well as, it is possible to prevent erroneous reading of the document on the display portion even when the document placed on the document platen sticks out from the document platen to extend over the display screen.

Another object of the present invention is to provide a document reading apparatus, comprising: a document reading portion for reading an image of a document placed on a document platen; a display portion disposed next to the document platen and having an area sensor for reading an image of a small-sized document placed on a display screen; and a control portion for performing control, when detecting that a document is on the document platen or on the display screen, for reading an image of the document by the document reading portion or the area sensor, wherein when detecting that the document is on the document platen and detecting that an object placed on the display screen does not have a standard size by the area sensor, the control portion performs control so that the document reading portion performs reading of the image of the document on the document platen and the area sensor is prohibited from reading the image of the document.

Another object of the present invention is to provide the document reading apparatus, wherein the display portion performs display showing an area on the display screen, on which a document of the standard size is to be placed.

Another object of the present invention is to provide the document reading apparatus, wherein the control portion determines whether or not the standard size based on output of a sensor disposed at a position corresponding to the standard size within the area.

Another object of the present invention is to provide the document reading apparatus, wherein the control portion has a selecting portion for selecting, when documents are placed on both of the display screen and the document platen, that reading is to be performed for which document, based on a user operation.

Another object of the present invention is to provide the document reading apparatus, wherein the display portion has a touch panel, and the selecting portion displays a reading key on a blank area of the display portion capable of performing an operation with the touch panel and performs reading of the document on the display screen when the displayed reading key is operated by a user.

Another object of the present invention is to provide the document reading apparatus, wherein the display portion displays preview of the image of the document read by control at the control portion.

Another object of the present invention is to provide the document reading apparatus, comprising an automatic document feeder for feeding a document onto the document platen, wherein when concurrently detecting documents on the automatic document feeder, the document platen, and the display screen, the control portion performs control for reading the image of the document on the document platen.

Another object of the present invention is to provide an image forming apparatus comprising the document reading apparatus.

BRIEF DESCRIPTION OF THE DRAWINGS

FIGS. 9A to 9C are views showing an example where a document is placed on the integral display portion of FIG. 8;

PREFERRED EMBODIMENTS OF THE INVENTION

The preferred embodiments of a document reading apparatus and an image forming apparatus including the document reading apparatus of the present invention will hereinafter be described referring to the accompanying drawings.

Figure 1:
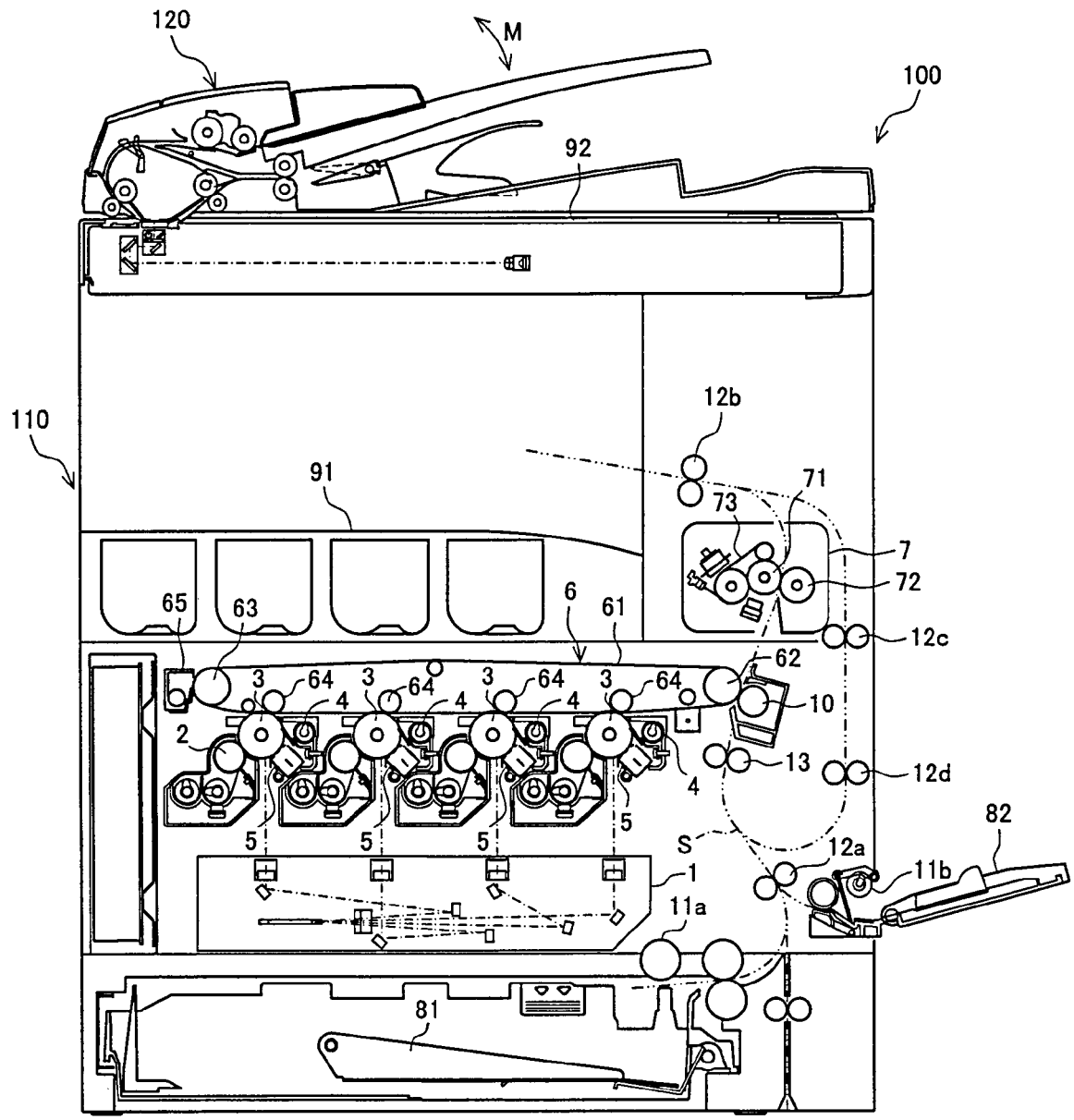
FIG. 1 is a view showing a structural example of an image forming apparatus according to an embodiment of the present invention.

FIG. 1 is a view showing a structural example of an image forming apparatus according to an embodiment of the present invention, where 100 denotes the image forming apparatus. The image forming apparatus 100 forms polychrome and monochrome images on predetermined sheets (recording paper) in response to image data transmitted from the outside and is composed of an apparatus main body 110 and an automatic document feeder 120, and can be illustrated as an MFP or the like regardless of digital/analogue.

The apparatus main body 110 is composed of an exposure unit 1, development devices 2, photoreceptor drums 3, cleaner units 4, charging devices 5, an intermediate transfer belt unit 6, a fixing unit 7, a paper feeding cassette 81, a paper ejection tray 91, and the like.

On the upper portion of the apparatus main body 110, a document platen 92 made of transparent glass, on which a document is placed, is provided, and the automatic document feeder 120 is attached on the upper side of the document platen 92. The automatic document feeder 120 automatically feeds a document on the document platen 92. In addition, the automatic document feeder 120 is structured rotatable in the direction indicated by an arrow M so that a document can be manually placed by opening an upper part of the document platen 92.

Image data handled by the image forming apparatus 100 corresponds to a color image that uses colors of black (K), cyan (C), magenta (M), and yellow (Y). Consequently, four pieces are provided for the development device 2, the photoreceptor drum 3, the charging device 5, and the cleaner unit 4 respectively, such that four types of latent images corresponding to each color are formed, and are respectively set for black, cyan, magenta, and yellow, which constitute four image stations.

The charging device 5 is a charging means for uniformly charging a surface of the photoreceptor drum 3 to have a predetermined voltage and the contact type such as roller type or brush type charging device may be used, in addition to the charger type as shown in FIG. 1.

The exposure unit 1 is constituted as a laser scanning unit (LSU) including a laser irradiating portion, a reflecting mirror, and the like. The exposure unit 1 is provided with a polygon mirror for scanning laser beam, and optical elements such as lenses and mirrors for guiding laser light reflected by the polygon mirror to the photoreceptor drums 3. The structure of the optical scanning device comprising the exposure unit 1 will be described in detail later. The exposure unit 1 may also use, for example, an EL or LED writing head in which light emitting elements are arranged in an array.

The exposure unit 1 has a function for exposing the charged photoreceptor drums 3 depending on input image data to form electrostatic latent images corresponding to the image data on the surfaces thereof. The development device 2 visualizes the electrostatic latent image formed on each photoreceptor drum 3 with toner of four colors (YMCK). Moreover, the cleaner unit 4 removes and collects toner remained on the surface of the photoreceptor drum 3 after development and image transfer.

The intermediate transfer belt unit 6 disposed on the upper part of the photoreceptor drums 3 includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided corresponding to each color of YMCK.

The intermediate transfer belt 61 is rotationally driven in a tensioned state by the intermediate transfer belt driving roller 62, the intermediate transfer belt driven roller 63, and the intermediate transfer rollers 64. In addition, each of the intermediate transfer rollers 64 applies a transfer bias for transferring the toner images on the photoreceptor drums 3 onto the intermediate transfer belt 61.

The intermediate transfer belt 61 is arranged so as to touch each of the photoreceptor drums 3. The intermediate transfer belt 61 has a function for forming a color toner image (multicolor toner image) on the intermediate transfer belt 61 by successively transferring the toner images of each color formed on the photoreceptor drums 3 on top of each other onto the intermediate transfer belt 61. The intermediate transfer belt 61 is formed in an endless shape, for example, using a film having a thickness of around 100 μm to 150 μm.

Transfer of the toner images from the photoreceptor drums 3 to the intermediate transfer belt 61 is carried out by the intermediate transfer rollers 64 that are in contact with a back side of the intermediate transfer belt 61. A high voltage transfer bias (a high voltage (+) that has the polarity opposite to the charging polarity (−) of the toner) is applied to the intermediate transfer rollers 64 to transfer the toner images. The intermediate transfer rollers 64 are rollers based on metal (for example stainless steel) shafts with a diameter of 8 to 10 mm and the surfaces thereof are covered with an electrically conductive elastic material (for example, EPDM and urethane foam or the like). This electrically conductive elastic material makes it possible to apply a uniform high voltage to the intermediate transfer belt 61. In the present embodiment, the rollers are used as transfer electrodes, but it is also possible to use brushes and the like.

The electrostatic image visualized on each photoreceptor drum 3 depending on each color as described above is piled up on the intermediate transfer belt 61. In this way, with the rotation of the intermediate transfer belt 61, the piled up image information is transferred onto a sheet by a transfer roller 10, which will be described later, disposed at a contact position between the sheet and the intermediate transfer belt 61.

At this time, the intermediate transfer belt 61 and the transfer roller 10 are contacted with pressure each other by a predetermined nip and a voltage (a high voltage (+) that has a polarity opposite to the charging polarity (−) of the toner) is applied to the transfer roller 10 to transfer the toner to the sheet. In addition, to obtain the nip constantly, either of the transfer roller 10 or the intermediate transfer belt driving roller 62 is made of a hard material (metal or the like) and the other is made of a soft material such as an elastic roller (elastic rubber roller, resin foam roller or the like).

Furthermore, as described above, since toner that adheres to the intermediate transfer belt 61 due to contact with the photoreceptor drums 3, or toner that is not transferred onto the sheet by the transfer roller 10 and remains on the intermediate transfer belt 61 causes color mixture of the toner at the next process, the toner is removed and collected by the intermediate transfer belt cleaning unit 65. The intermediate transfer belt cleaning unit 65 includes a cleaning blade, for example, as a cleaning member that touches the intermediate transfer belt 61, and the intermediate transfer belt 61 with which the cleaning blade is in contact is supported from its back side by the intermediate transfer belt driven roller 63.

The paper feeding cassette 81 is a tray for storing sheets (recording paper) used for image formation and is provided on the lower side of the exposure unit 1 of the apparatus main body 110. Sheets used for image formation can be also placed on a manual paper feeding cassette 82. In addition, the paper discharge tray 91 provided on the upper side of the apparatus main body 110 is a tray for accumulating printed sheets face-down.

Moreover, the apparatus main body 110 is provided with a paper conveying path S of substantially vertical shape for sending sheets in the paper feeding cassette 81 and the manual paper feeding cassette 82 to the paper discharge tray 91 via the transfer roller 10 and the fixing unit 7. Pickup rollers 11*a* and 11*b*, a plurality of conveyance rollers 12*a* to 12*d*, a resist roller 13, the transfer roller 10, the fixing unit 7, and the like are disposed in a vicinity of the paper conveying path S from the paper feeding cassette 81 or the manual paper feeding cassette 82 to the paper discharge tray 91.

The conveyance rollers 12*a* to 12*d* are small-sized rollers for facilitating/assisting in conveying sheets, and a plurality of these are provided along the paper conveying path S. In addition, the pickup roller 11*a* is provided near the end portion of the paper feeding cassette 81 and picks up sheets one by one from the paper feeding cassette 81 to feed to the paper conveying path S. Similarly, the pickup roller 11*b* is provided near the end portion of the manual paper feeding cassette 82 and picks up sheets one by one from the manual paper feeding cassette 82 to feed to the paper conveying path S.

The resist roller 13 temporarily holds the sheet conveyed in the paper conveying path S. The resist roller 13 also has a function for conveying the sheet to the transfer roller 10 at a timing when the leading edge of the toner image on the photoreceptor drum 3 comes to the leading edge of the sheet.

The fixing unit 7 includes a heat roller 71 and a pressure roller 72, and the heat roller 71 and the pressure roller 72 rotate holding the sheet between them. In addition, the heat roller 71 is set to have a predetermined fixing temperature by a control portion based on signal from a temperature detector (not-shown) and has a function for melting/mixing/pressing the multicolor toner image transferred to the sheet to thermally fix to the sheet by thermocompressing toner to the sheet together with the pressure roller 72. Moreover, an external heat belt 73 is provided for externally heating the heat roller 71.

Next, the sheet conveying path will be described in detail. As has been described above, the image forming apparatus 100 is provided with the paper feeding cassette 81 for previously storing sheets, and the manual paper feeding cassette 82. In order to feed sheets from the paper feeding cassettes 81 and 82, the pickup rollers 11*a* and 11*b* are disposed so as to guide the sheets to the paper conveying path S one by one.

The sheet conveyed from each of the paper feeding cassettes 81 and 82 is conveyed to the resist roller 13 by the conveyance roller 12*a* in the paper conveying path S and is conveyed to the transfer roller 10 at a timing when the leading edge of the sheet comes to the leading end of the image information on the intermediate transfer belt 61, and the image information is then written to the sheet. Thereafter, the sheet passes through the fixing unit 7 so that unfixed toner on the sheet is thermally melted/fixed, and the sheet is discharged on the paper discharge tray 91 through the conveyance roller 12*b* disposed behind.

The above-mentioned conveying path is for a case where single side printing is requested for the sheet, on the other hand, in a case where duplex printing is requested, when a rear end of the sheet on which the single side printing is completed and which has passed through the fixing unit 7 is held by the last conveyance roller 12b, the conveyance roller 12b is rotated in the opposite direction to guide the sheet to the conveyance rollers 12c and 12d. After the sheet passed through the resist roller 13 and the printing was performed on its back side, the sheet is discharged in the paper discharge tray 91.

Figure 2:
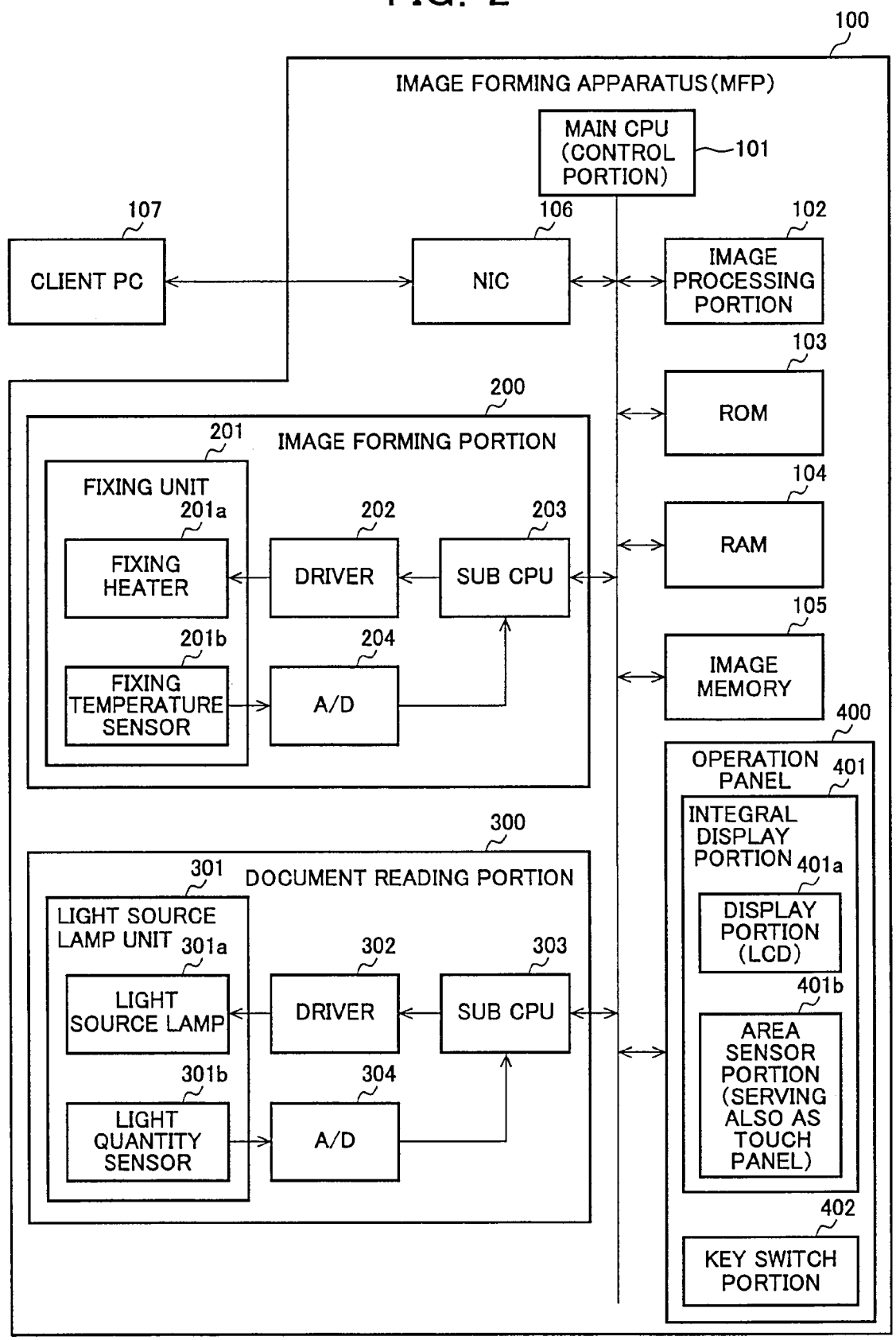
FIG. 2 is a block diagram showing a structural example of the image forming apparatus shown in FIG. 1.

FIG. 2 is a block diagram showing a structural example of the image forming apparatus 100 shown in FIG. 1. In the figure, the image forming apparatus 100 includes a main CPU (Central Processing Unit) 101 corresponding to a control portion of the present invention. In addition, the main CPU 101 is connected to an image processing portion 102, a ROM (Read Only Memory) 103, a RAM (Random Access Memory) 104, an image memory 105, an NIC (Network Interface Card) 106, an operation panel 400, a sub CPU 203, and a sub CPU 303.

Based on an operation from a client PC (Personal Computer) 107 through the NIC 106 or a user operation from the operation panel 400, the main CPU 101 integrally controls each input/output device within the image forming apparatus 100 in accordance with a program previously written into the ROM 103, and temporarily stores data input/output during this operation in a predetermined memory area of the RAM 104.

The NIC 106 is a communication means for performing communication through a communication line with the client PC 107. The image forming apparatus 100 performs printing based on print data transferred from the client PC 107. More specifically, the print data transmitted from the client PC 107 is subjected to image processing at the image processing portion 102 as the occasion demands, stored in the image memory 105, and printed by an image forming portion 200. The image forming apparatus 100 is also capable of performing processing of transferring image data obtained by a document reading portion 300 or an area sensor portion 401b, which will be described later, to the client PC 107 through the NIC 106. Moreover, a file and a password transmitted from the client PC 107 are stored in HDD (Hard Disk Drive) (not-shown).

The operation panel 400 includes an integral display portion 401, and a key switch portion 402, such as a ten-key and a start key, for performing a user operation. The integral display portion 401 is integrally provided with a display portion 401a corresponding to a display portion of the present invention, such as a liquid crystal display (LCD), and the area sensor portion 401b for optically reading an image of a small-sized document, mainly including a name card, an ID card such as a driver's license, and an L-sized picture. Moreover, the display portion 401a displays a graphical user interface (GUI) image at the time of user operation, such as display of the condition of the image forming apparatus 100, compatible paper size and copying magnification and display of pressed areas of various operation keys. Note that, the area sensor portion 401b detects reflected light by a finger of a user so that a coordinate position of the finger on a screen can be specified. Accordingly, the area sensor portion 401b can be also used as an optical touch panel used for user operation.

The content of the user operation input from the key switch portion 402 and the touch panel is provided to the main CPU 101, and data of the image read by the area sensor portion 401b is provided to the image processing portion 102.

The document reading portion 300 is controlled by the sub CPU 303, and includes a light source lamp unit 301, a driver 302 and an A/D converter 304, for optically reading an image of a document placed on a document platen to provide to the image processing portion 102. The light source lamp unit 301 corresponds to the exposure unit 1 shown in FIG. 1, and includes a light source lamp 301a, and a light quantity sensor 301b such as a CCD (Charge Coupled Device). The light quantity sensor 301b detects the quantity of the light irradiated from the light source lamp 301a of the light source lamp unit 301 and inputs light quantity data to the sub CPU 303.

The image processing portion 102 receives the image data read by the document reading portion 300 or the area sensor portion 401b and applies various image processing. The image memory 105 stores the image data output from the image processing portion 102 and provides the image data to the image forming portion 200, in a state where the image data of a predetermined unit, such as a page unit, is stored. Note that, the image data read by the document reading portion 300 or the area sensor portion 401b may be temporarily stored in the image memory 105 until the image data is in a processing unit of the image processing portion 102 to be written again after the image processing. In addition, the read image data may be input as it is to the image memory 105 for printing without passing the image processing portion 102 or be stored in the HDD (not-shown).

The image forming portion 200 is controlled by the sub CPU 203, and includes a fixing unit 201, a driver 202 and an A/D converter 204, for printing image data transmitted from the image memory 105. The fixing unit 201 corresponds to the fixing unit 7 shown in FIG. 1, and includes a fixing heater 201a and a fixing temperature sensor 201b. The fixing temperature sensor 201b detects a temperature of the heat roller 71 in the fixing unit 7 of FIG. 1 to output temperature data to the sub CPU 203.

Description will be given for recovery processing by the main CPU 101 when a power source is in a stand-by mode. The main CPU 101 transmits a predetermined warm-up command to the sub CPU as first recovery processing. When receiving the predetermined warm-up command from the main CPU 101, the sub CPU 203 applies electric current to the fixing heater 201a through the driver 202, and controls energizing of the fixing heater 201a so that a surface temperature of the heating roller 71 heated by the fixing heater 201a is made constant at a predetermined temperature, based on temperature information obtained from the fixing temperature sensor 201b. Here, the driver 202 drives the fixing heater 201a built in the heat roller of the fixing unit 201 based on control data output from the sub CPU 203. When the surface of the heat roller 71 reaches the predetermined temperature, the sub CPU 203 determines that it reaches processing capable state (ready state) and notifies the main CPU 101 of the fact.

Furthermore, the main CPU 101 transmits a predetermined warm-up command to a sub CPU 303 as second recovery processing. When receiving the predetermined warm-up command from the main CPU 101, the sub CPU 303 applies electric current to the light source lamp 301a through the driver 302, and controls energizing of the light source lamp 301a so that light quantity of the light source lamp 301a is made constant at predetermined light quantity, based on light quantity information obtained from the light quantity sensor 301b. Here, the driver 302 drives the light source lamp 301a based on control data output from the sub CPU 303. When the light quantity of the light source lamp 301a reaches the predetermined light quantity, the sub CPU 303 determines that it reaches processing capable state (ready state) and notifies the main CPU 101 of the fact.

Note that, in addition to the above-mentioned structure, many input/output devices that are operated in image forming processing and document reading processing, including a motor, a clutch, a solenoid, and a sensor, are connected to the sub CPU 203 and the sub CPU 303, respectively. In the image forming processing and the document reading processing, each of the sub CPU 203 and the sub CPU 303 reads detection data of a sensor thereof at a predetermined timing to drive a motor and the like depending on the detection data.

In the example of FIG. 2, the document reading apparatus according to the present invention is composed of the main CPU 101, the document reading portion 300, and the integral display portion 401 that is included in the operation panel 400 and that is integrally provided with the area sensor portion 401b. That is, the document reading apparatus according to the present invention is provided with a display integral document reading apparatus having a document reading function in a display portion for performing an apparatus operation, like the integral display portion 401, so that a document image can be read on a display screen of the operation panel 400 using an area sensor in the case of a small-sized document. Accordingly, since it is not necessary to set a document for reading on the document platen, an operation of opening/closing the document cover is not required, thus improving the convenience. Furthermore, since a document is placed on the operation panel 400 easily attracting user's attention, it is possible to prevent the document from being left behind.

Figure 3:
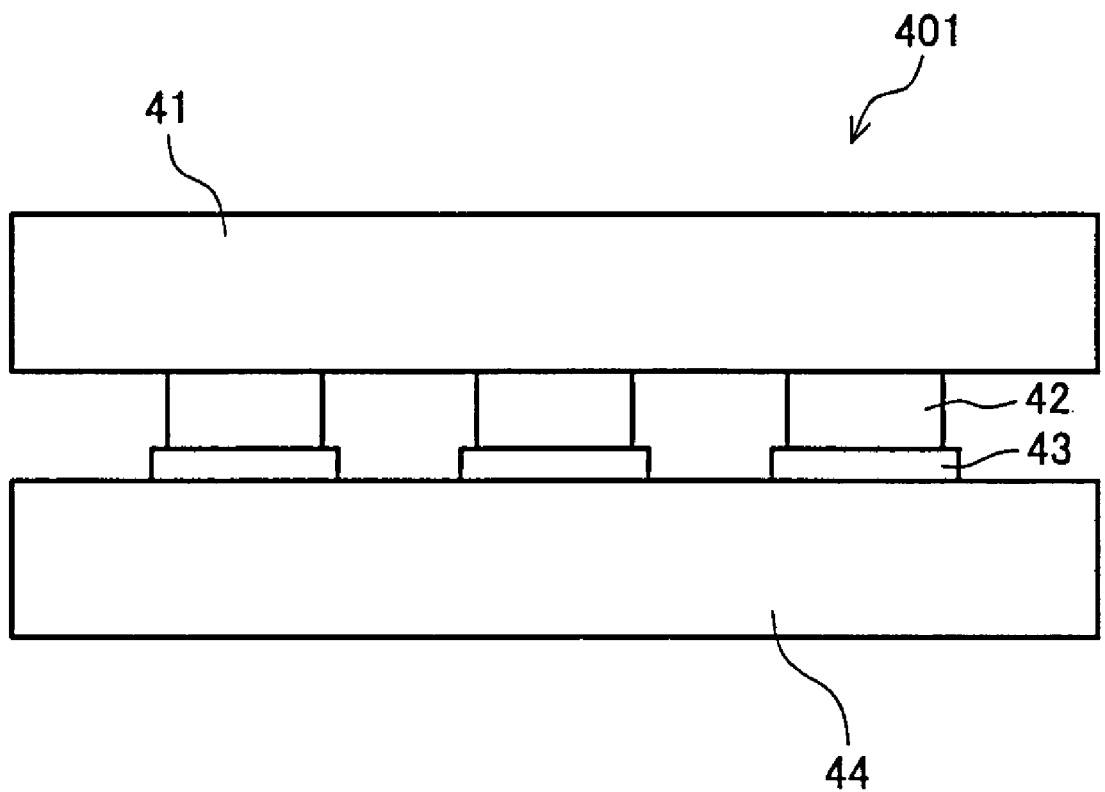
FIG. 3 is a view showing an example of the structure of an integral display portion according to the present invention.

Concerning the document reading apparatus according to the present invention, a structural example of the area sensor portion 401b will be firstly given referring to FIG. 3. FIG. 3 is a view showing an example of the structure of the integral display portion 401 according to the present invention, where 41 denotes a liquid crystal layer, 42 denotes an optical sensor, 43 denotes a light shielding layer, and 44 denotes a backlight light source.

The area sensor portion 401b includes a plurality of micro optical sensors 42 that are uniformly disposed on an XY plane for detecting incident light from the display screen, and is positioned at the midpoint between the liquid crystal layer 41 of the display portion 401a and the backlight light source 44. As the optical sensor 42, for example, a photodiode is used. Moreover, the light shielding layer 43 is formed on the optical sensor 42 so that no light from the backlight light source 44 enters. When an object touches the surface of the liquid crystal layer 41, the light from the backlight light source 44 is reflected on the object to enter in the optical sensor 42, and thereby an image shape of the object is output as image data.

Note that, in FIG. 3, the optical sensor and the backlight light source are disposed, for example, based on a well-known method (Japanese Laid-Open Patent Publication No. 2004-153327 and the like). Since the area which is occupied by the optical sensor is minute, gaps with sufficient width are actually formed between the optical sensors. In addition, backlight light is irradiated and diffused through the gaps, thus the liquid crystal display is not affected even when the optical sensors are disposed like in FIG. 3.

Figure 4:
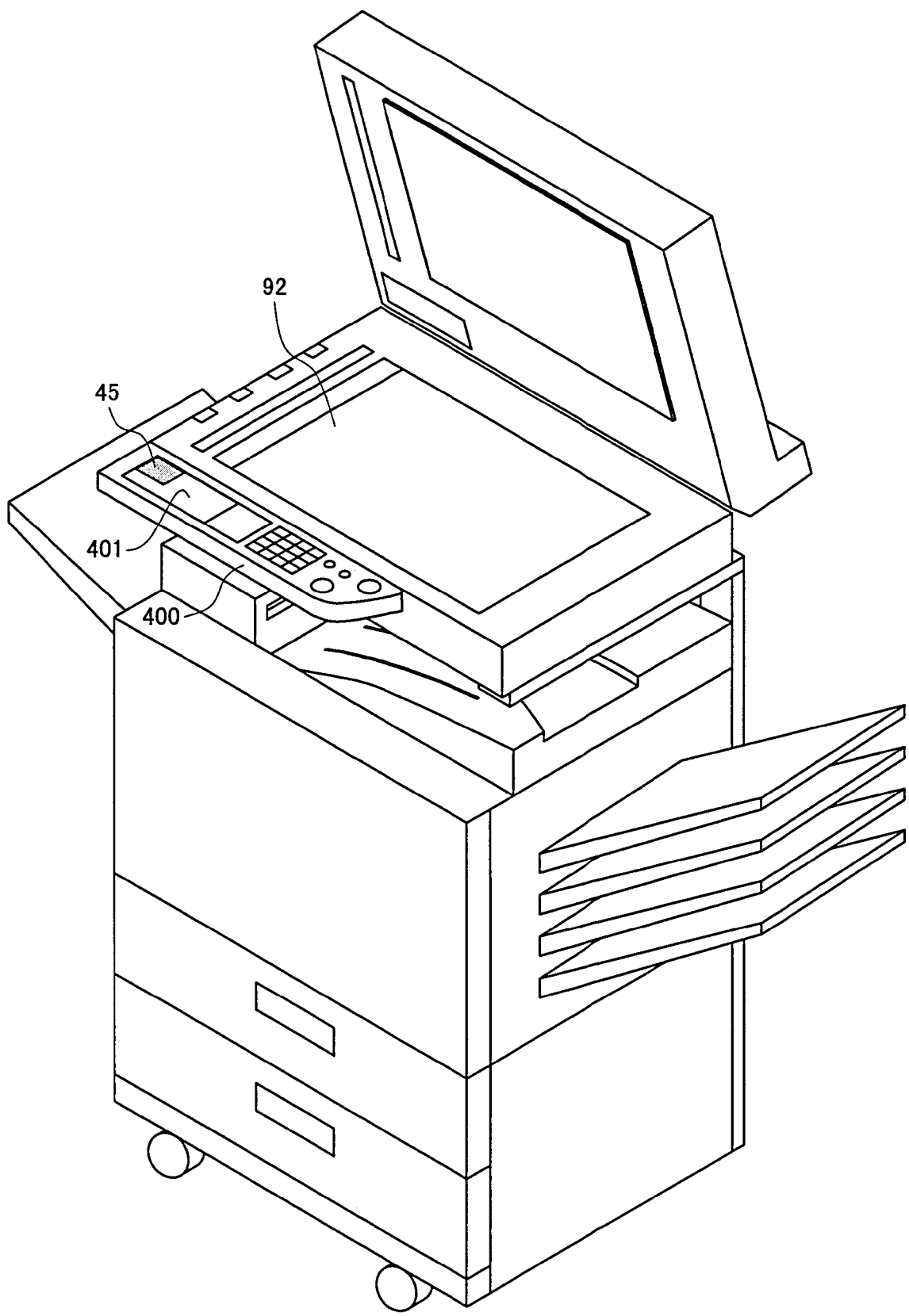
FIG. 4 is an external view showing a structural example of the image forming apparatus shown in FIGS. 1 and 2, which shows a state where a document is placed only on an operation panel included in a document reading apparatus of the present invention.
Figure 5:
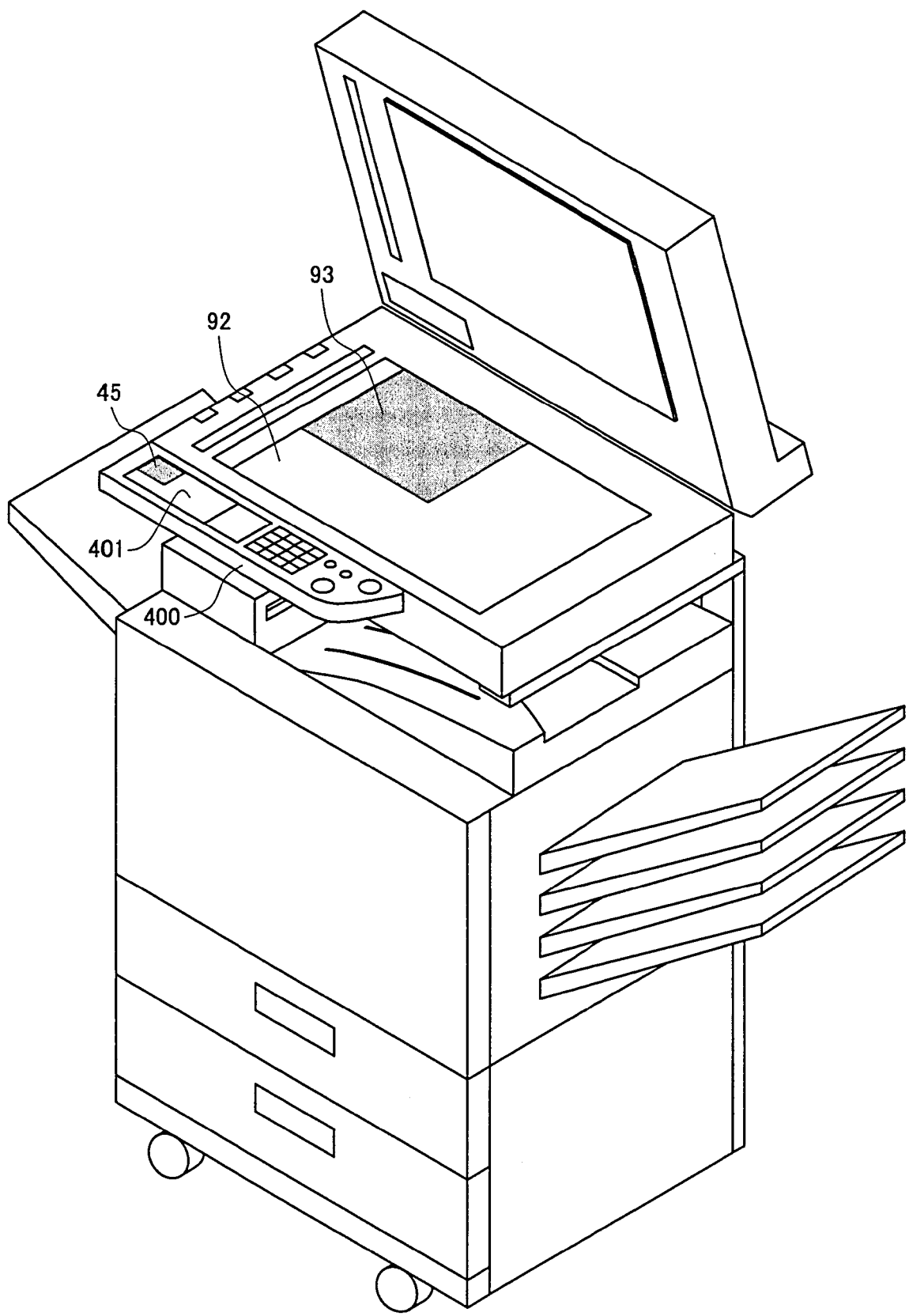
FIG. 5 is an external view showing a structural example of the image forming apparatus shown in FIGS. 1 and 2, which shows a state where different documents are placed on both of the operation panel included in the document reading apparatus of the present invention and a document platen.
Figure 6:
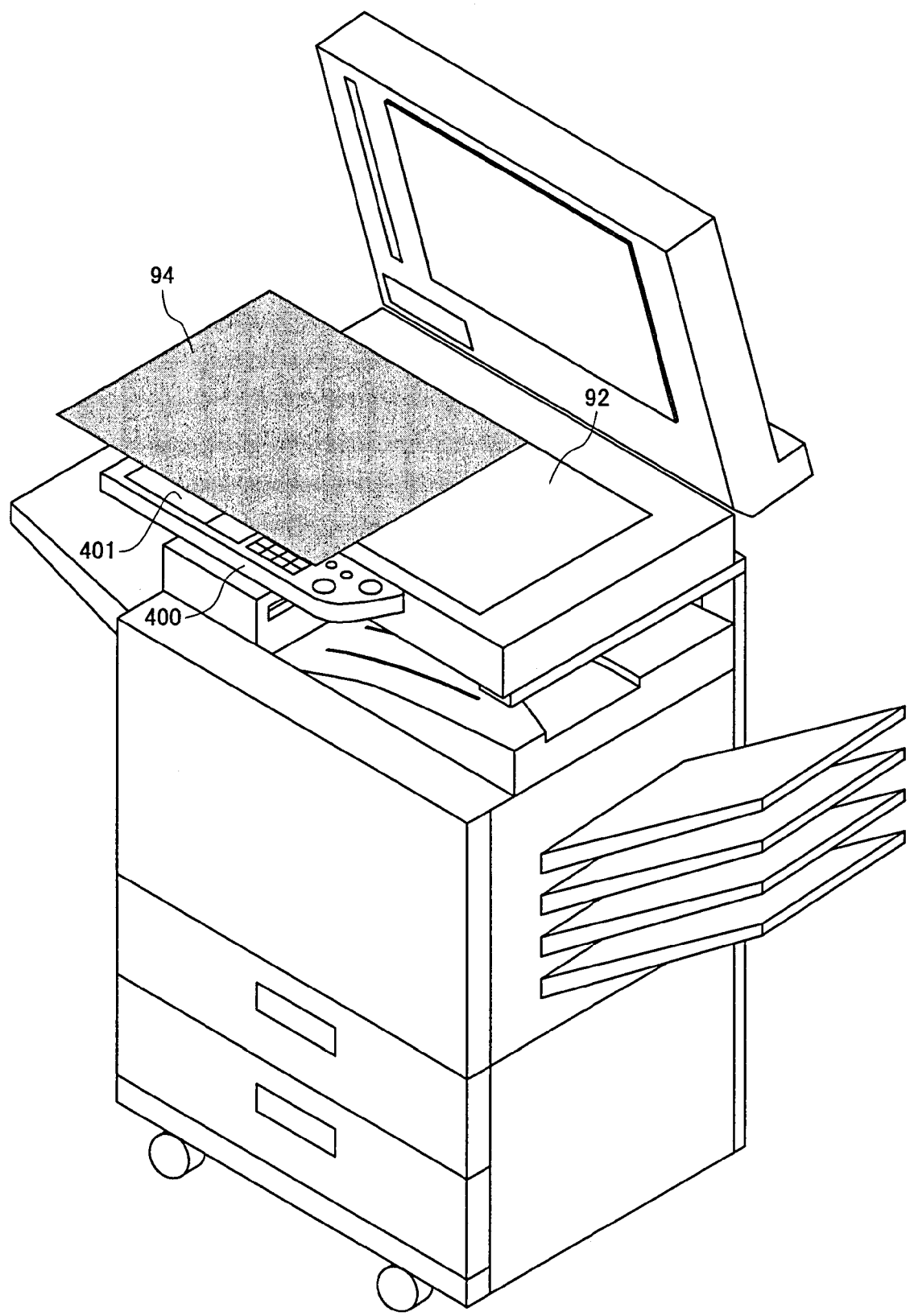
FIG. 6 is an external view showing a structural example of the image forming apparatus shown in FIGS. 1 and 2, which shows a state where a document is placed on the document platen extending over the operation panel included in the document reading apparatus of the present invention.

Next, processing of the control portion (main CPU 101) of the document reading apparatus according to the present invention will be described in detail. FIGS. 4 to 6 are external views showing a structural example of the image forming apparatus shown in FIGS. 1 and 2, where FIG. 4 shows a state where a document is placed only on the operation panel included in the document reading apparatus of the present invention, FIG. 5 shows a state where different documents are placed on both of the operation panel included in the document reading apparatus of the present invention and the document platen, and FIG. 6 shows a state where a document is placed on the document platen extending over the operation panel included in the document reading apparatus of the present invention.

First, the document platen 92 is provided on a surface continuing to the display screen of the integral display portion 401, as shown in FIGS. 4 to 6. Here, the continuous surface will additionally be described. The display plane of the integral display portion 401 may be provided on the same plane as a horizontal plane on which the document platen 92 is disposed, or may be provided not on the same plane but on a parallel plane or on a slightly inclined plane. That is, the integral display portion 401 is disposed next to the document platen 92.

As has been described above, the document reading apparatus is capable of reading a small-sized document 45, such as a driver's license and a name card, set on the screen of the integral display portion 401 by the area sensor portion 401b, and is capable of reading an image of a document placed on the document platen 92 by the document reading portion 300. In addition, the main CPU 101 controls reading of the document image at the area sensor portion 401b and controls reading of the document image at the document reading portion 300. Here, basically, when detecting that a document is on the document platen 92 or on the display screen of the integral display portion 401, the main CPU 101 controls reading of the document image by the document reading portion 300 or the area sensor portion 401b. However, in the present invention, since the same document can be placed on both of the integral display portion 401 and the document platen 92 due to positional relationship therebetween, the main CPU 101 differentiates the control according to either of which the document is placed on or whether or not documents are placed on both of them.

First, when a document is placed only on the integral display portion 401 as shown in FIG. 4, the area sensor portion 401b can detect the document 45, whereas the document reading portion 300 or an additionally provided document detection sensor can not detect the document. Upon receiving such detection result, the main CPU 101 instructs the area sensor portion 401b to read an image after a start key of the key switch portion 402 was pressed or a start operation using a touch panel function of the area sensor portion 401b was conducted. The area sensor portion 401b reads an image of the document 45 on the integral display portion 401 to provide to the image processing portion 102 (or the image memory 105).

Moreover, when a document is placed only on the document platen 92 and the document does not cover a part or all of the integral display portion 401, which is not shown, the area sensor portion 401b can not detect an object such as a document and only the document reading portion 300 or the additionally provided document detection sensor can detect the document. Upon receiving such detection result, the main CPU 101 instructs the document reading portion 300 to read an image after the start key of the key switch portion 402 was pressed or a start operation with the touch panel was conducted. The document reading portion 300 reads an image of the document on the document platen 92 to provide to the image processing portion 102 (or the image memory 105).

Meanwhile, as shown in FIGS. 5 and 6, when documents are placed on both of the integral display portion 401 and the document platen 92, the area sensor portion 401b can detect an object (herein, the document), and the document reading portion 300 or the additionally provided document detection sensor also can detect the document. Upon receiving such detection result, the main CPU 101 firstly determines whether the document detected by the area sensor portion 401b and the document detected by the document reading portion 300 or the additionally provided document detection sensor are different documents 45 and 93 as shown in FIG. 5, or the same document, where the document 94 on the document platen 92 sticks out over the integral display portion 401.

More specifically, when objects such as a document are placed on both of the display screen of the display portion 401a and the document platen 92 (that is, when it is detected that objects are placed on both of them), the main CPU 101 determines whether or not the document placed on the display screen has a standard size (any of one or more of standard sizes). The detection of the document size will be described later referring to FIG. 10.

Moreover, as a result of the determination, when the document has a standard size, the main CPU 101 controls so that the area sensor portion 401b reads an image of the document 45 placed on the display screen. That is, when the document detected on the integral display portion 401 has a standard size, priority is given to image reading on the integral display portion 401 (that is, image reading on the area sensor portion 401b). Here, the main CPU 101 instructs image the area sensor portion 401b to read an image after the start key of the key switch portion 402 was pressed or a start operation with the touch panel was conducted. In the example of FIG. 5, in accordance with the instruction, the area sensor portion 401b reads the image of the document 45 on the integral display portion 401 to provide to the image processing portion 102 (or the image memory 105). Here, when the document detected on the integral display portion 401 has a standard size, priority may be given to image reading on the document reading portion 300 and the control may be performed so that both documents are eventually read.

Meanwhile, as a result of the determination, when the document does not have a standard size (that is, a non-standard size), the main CPU 101 determines that the document is a continuation of the document placed on the document platen 92 and sticks out of the document platen 92 to extend over the integral display portion 401, performs the control so that the document reading portion 300 reads the image of the document on the document platen 92, as well as controls so that the area sensor portion 401b is prohibited to read the image of the document. Here, examples of the case where a document is judged as a continuation of the document placed on the document platen 92 include a case where the document is an oversize document like the document 94 shown in FIG. 6, a case where a user places a not so large but longwise document in a vertical direction, and the like.

In this way, when the object detected on the integral display portion 401 has a non-standard size, only image reading on the document platen 92 (that is, image reading on the document reading portion 300) is performed. That is, when detecting that the document is on the document platen 92 and an object with a non-standard size is on the display screen, the main CPU 101 performs reading on the document reading portion 300 and prohibits reading on the area sensor portion 401b. Here, the main CPU 101 instructs the document reading portion 300 to read an image after the start key of the key switch portion 402 was pressed or a start operation with the touch panel was conducted. In the example of FIG. 6, in accordance with the instruction, the document reading portion 300 reads the image of the document 94 on the document platen 92 to provide to the image processing portion 102 (or the image memory 105). Note that, when receiving the above-mentioned result, the main CPU 101 may perform the above-mentioned determination when pressing is detected after the start key of the key switch portion 402 was pressed.

In this way, in the present invention, as illustrated in FIG. 6, even when the document 94 sticks out of the document platen 92 to extend over the integral display portion 401, it is possible to prevent that the document on the integral display portion 401 is erroneously read. Furthermore, in the present invention, it is detected that the document is placed on the integral display portion 401 and a mode for reading a document is automatically switched between a mode for reading by the area sensor portion 401b and a mode for reading by the document reading portion 300, thus further improving the convenience.

Figure 7:
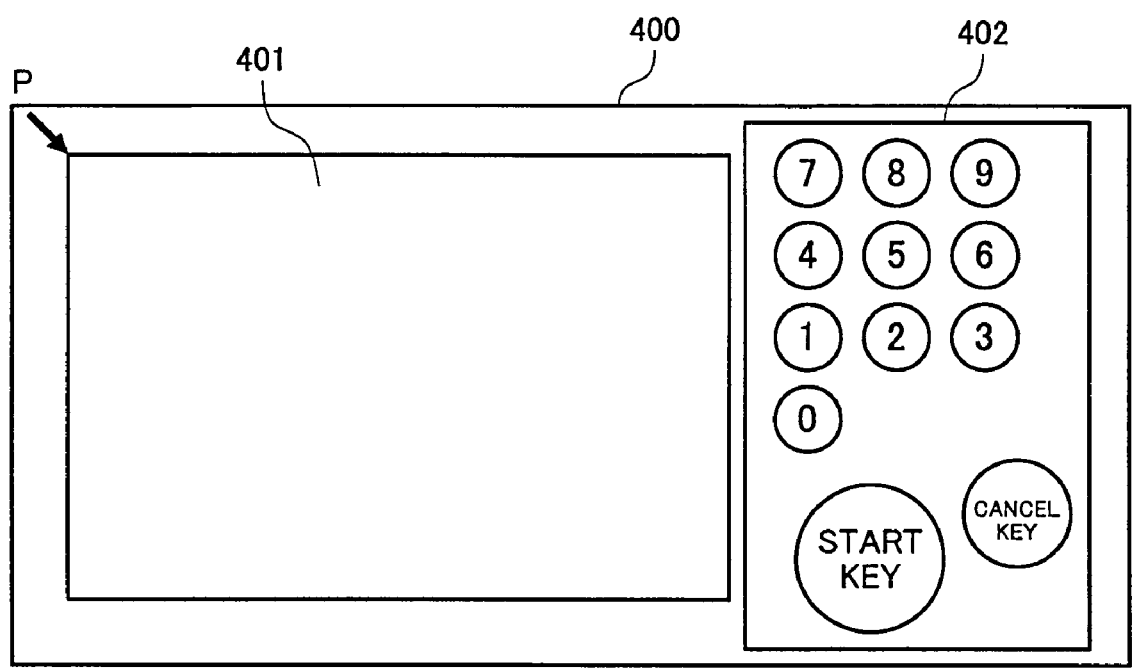
FIG. 7 is an external view showing the operation panel of FIGS. 4 to 6 in detail.
Figure 8:
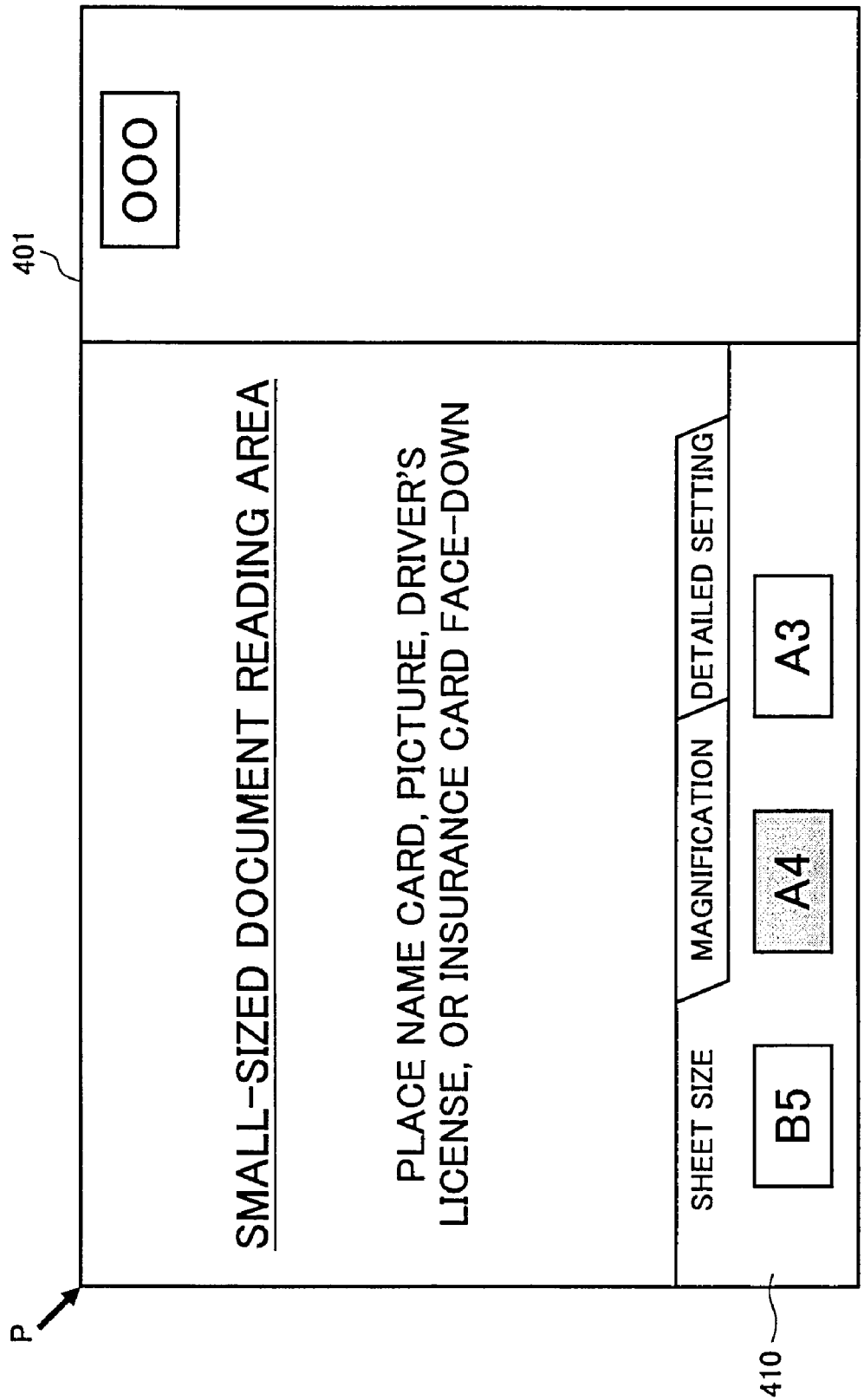
FIG. 8 is a view showing an example of display content of the integral display portion in the operation panel of FIG. 7.

Next, referring to FIGS. 7 to 9C, description will be given for a method of placing a document on the integral display portion 401 by a user and a preferable GUI screen for supporting the same. FIG. 7 is an external view showing the operation panel of FIGS. 4 to 6 in detail, and FIG. 8 is a view showing an example of display content of the integral display portion in the operation panel of FIG. 7. In FIGS. 7 and 8, P denotes a document positioning index point.

A readable area for a standard size document is preferably displayed, as shown in FIG. 8, as an initial screen on the integral display portion 401 of the operation panel 400 shown in FIG. 7. That is, the display portion 401a preferably performs display showing an area on the display screen, on which a standard size document is to be placed. FIG. 8 shows a state where no document is placed on the screen, and in the example of the initial screen, as a display showing this area, a "small-sized document reading area" is displayed and a menu tab 410 and the like are displayed on other areas.

The menu tab 410 displays various kinds of operation keys of the document reading apparatus for each menu tab (tab showing each setting item) so that each tab is switchable, for example, tabs including a sheet size, a magnification (enlarging/reducing magnification) and detailed setting are displayed so as to be switchable. Note that, in the present example, since "A4" is selected as the sheet size, a document is printed on a A4-sized sheet. Note that, the detailed setting tab allows, for example, setting of post processing, single side/duplex side, N in 1 and the like.

In addition, when a user desires to execute image reading of a document by the integral display portion 401, the user sets the document 45, as shown in FIG. 4, on an area where the "small-sized document reading area" is displayed based on the point P on the screen of the integral display portion 401 while viewing the initial screen of FIG. 8. Note that, description has been given with the screen of FIG. 8 as the initial display screen, another screen may be certainly prepared before reaching this screen.

Figure 9B:
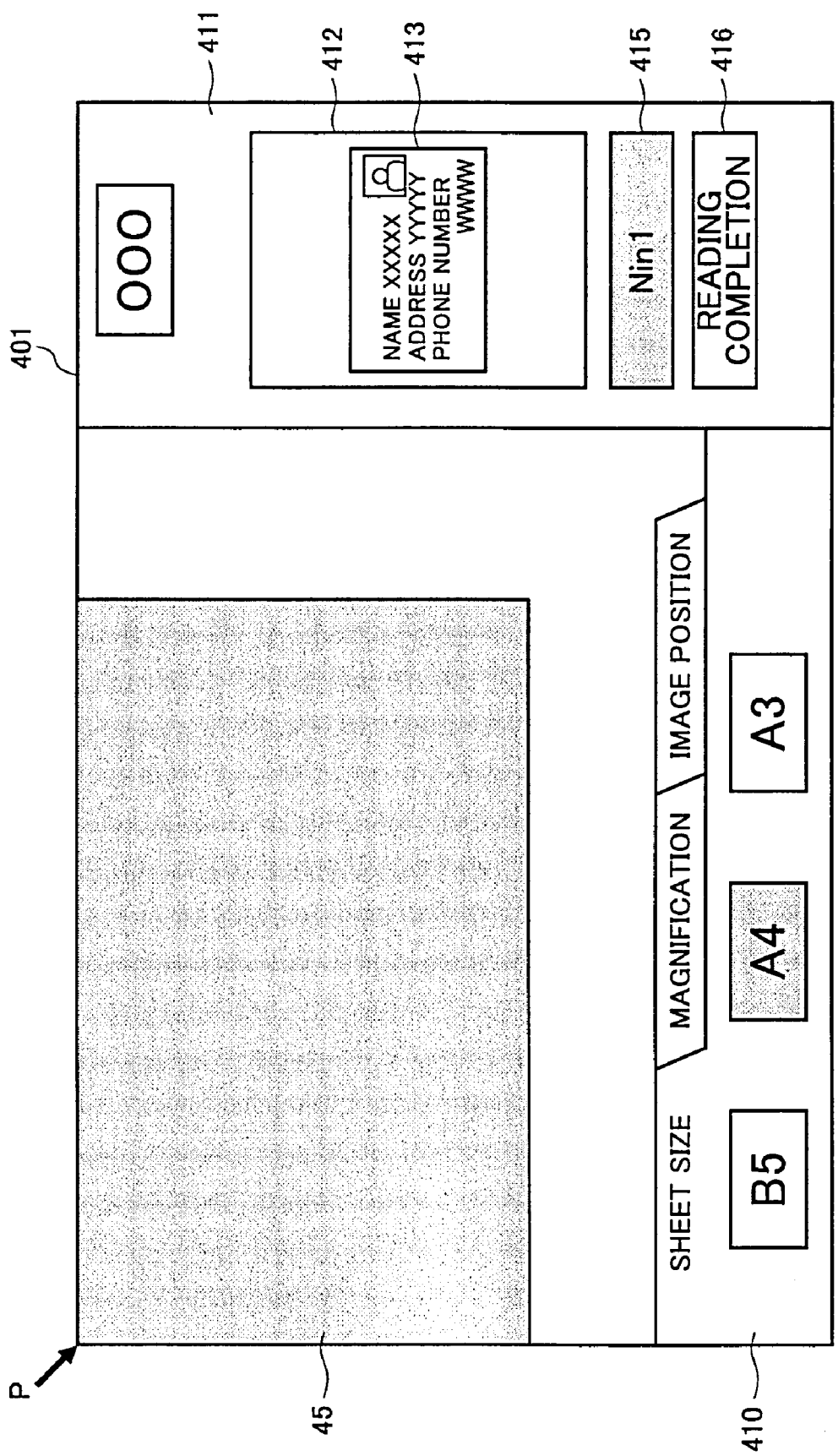

FIGS. 9A to 9C are views showing an example where a document is placed on the integral display portion of FIG. 8. FIG. 9A shows an example of a screen right after a small-sized document is placed, FIG. 9B shows an example of a screen after the start key was pressed in the state of FIG. 9A and reading processing was executed, and FIG. 9C shows an example of a screen after an N in 1 key is pressed in the state of FIG. 9B.

When the document 45 is set in the "small-sized document reading area" on the integral display portion 401, the main CPU 101 detects that the document 45 is placed on the screen by the area sensor portion 401b. When the main CPU 101 detects that the document 45 is placed on the screen, it moves to a "small-sized document reading mode". When receiving the switching to this mode from the main CPU 101, the display portion 401a makes a display showing that the "small-sized document reading mode" is set, for example, a message of "press start button to read small-sized document" as shown in FIG. 9A. Note that, in the example of FIG. 9A, with switching of the mode, the display portion 401a changes a right-side item in the menu tab from "detailed setting" to "image position" so as to allow setting of a print position of an image on a sheet.

In addition, as shown in FIG. 9A, when the user presses the "start key" of the key switch portion 402 provided in the operation panel 400 in a state where the document 45 is set on the screen, processing of reading the document 45 is started by the area sensor portion 401b. Alternatively, when a standard size document is placed, a start operation image is displayed at a position in the display portion 401a where no document is placed as a GUI, and reading of the document 45 by the area sensor portion 401b may be started when the user selects the image area.

Here, the display portion 401a preferably displays the read document image for preview by the control of the main CPU 101. The image displayed for preview is not the read document image as it is but a thinned thumbnail image. More specifically, with respect to image data of the document 45 read by the area sensor portion 401b, the display portion 401a displays a thumbnail image 413 thereof for preview on a preview area 411 as shown in FIG. 9B. The thumbnail image 413 may be generated by the image processing portion 102 or generated in the integral display portion 401. By performing preview display, the user is able to confirm the read state (finished state) of the document. Although the preview area is preferably in other than the "small-sized document reading area" as shown in FIG. 9B, when the preview area is therein, the user is able to confirm the preview display when the document 45 is removed after reading. Note that, a sheet outer shape 412 is selected as A4 size, and the thumbnail image 413 is displayed at a center of a rectangle of the sheet outer shape.

Furthermore, in the example of FIG. 9B, an N in 1 key 415 and a reading completion key 416 for performing confirmation of "N in 1" and "reading completion" are displayed as a GUI to allow reception of setting. The N in 1 key 415 is an operation key for confirming whether or not switching to a collecting (N in 1) mode for collecting a plurality of documents in a single page. When a user presses the N in 1 key 415, the document reading apparatus waits for the placement of an additional document (including a rear side of a document). When the user sets an additional document and presses the "start key", then the area sensor portion 401b reads the additional document and the display portion 401a displays it on the preview area 411 for preview. This processing is repeated by the number (N number) of additional documents. FIG. 9C shows the situation at this time. Here, the N in 1 key 415 is displayed in gray to show it is in the N in 1 mode. Moreover, the reading completion key 416 is a key for completing processing of reading an additional document, and the key is pressed to complete reading.

Figure 10:
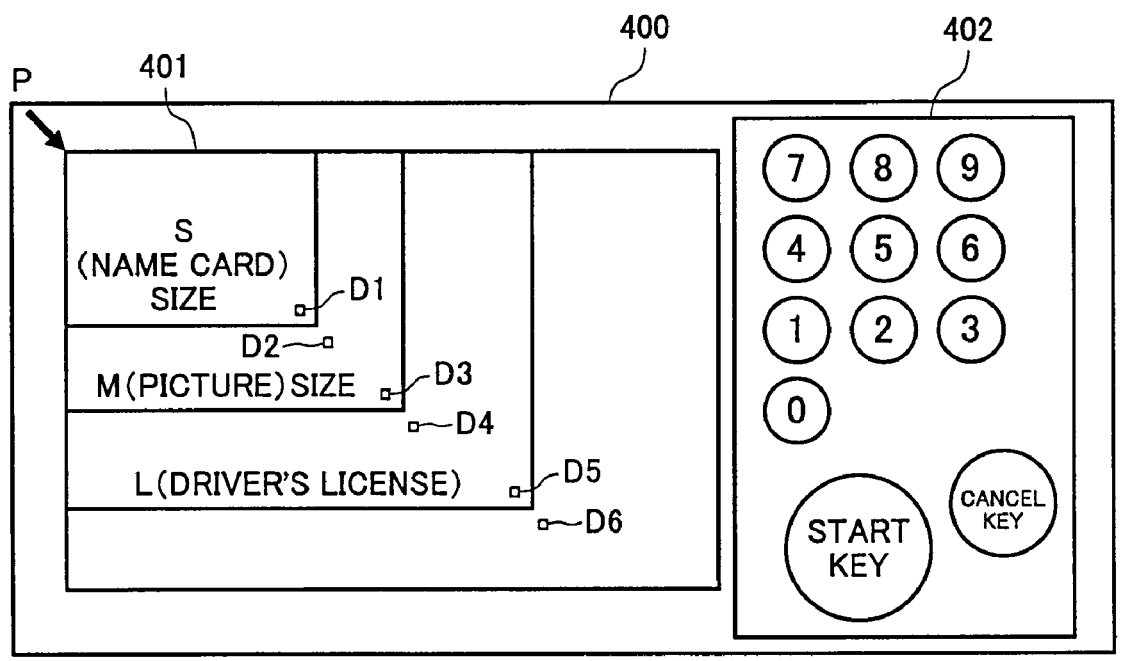
FIG. 10 is a view showing an example of a document size detecting portion for detecting a size of a document on the integral display portion of FIGS. 7 to 9C.

Next, description will be given for detection of a document size referring to FIG. 10. FIG. 10 is a view showing an example of a document size detecting portion for detecting a size of a document on the integral display portion of FIGS. 7 to 9C. The main CPU 101 preferably determines whether or not a standard size based on output from sensors disposed at positions corresponding to each standard size within an area on which a document is to be placed, that is, within the "small-sized document reading area". Here, each sensor is preferably aided by each light receiving element, but may be provided additionally. Note that, when each sensor is provided additionally and this allows only arrangement where a light receiving element of each area sensor is omitted because of space, the lacked pixel may be corrected (interpolated) for the result of reading a document image.

As each of the sensors, in the example of FIG. 10, standard size detecting portions (D1 to D6) are provided at each coordinate within and out of a document size at each corner part corresponding to predetermined standard sizes, including "S (name card) size", "M (picture) size" and "L (driver's license) size". Based on detection result from the standard size detection portions and the detection result of reflected light of a coordinate origin P (a detecting portion for detecting P may be provided additionally), whether or not a standard size can be determined. More specifically, when an area having the document placed thereon (document area) includes the coordinate origin P (0, 0) and a coordinate of one standard size detection portion and does not include a coordinate of a standard size detection portion for larger size by one size adjacent to the standard size, it is determined as the standard size. For example, when the document area includes the coordinate origin P (0, 0) and a coordinate of D1 and does not include a coordinate of D2, it is determined as an S-sized standard document. In addition, when the coordinate origin P and D1 are ON (with reflection light) and D2 to D6 are OFF (without reflection light), it is determined as an S size and a standard size. When the coordinate origin P and D1 to D3 are ON (with reflection light) and D4 to D6 are OFF (without reflection light), it is determined as an M size and a standard size. When the coordinate origin P and D1 to D5 are ON (with reflection light) and D6 is OFF (without reflection light), it is determined as an L size and a standard size. In this way, whether or not a standard size is determined.

Note that, the structure may be employed, such that setting of which light receiving element of the area sensor is to be used as the standard size detecting portion can be previously made. Thereby, it is possible to register a small-sized document with an optional size as a standard size.

Figure 11:
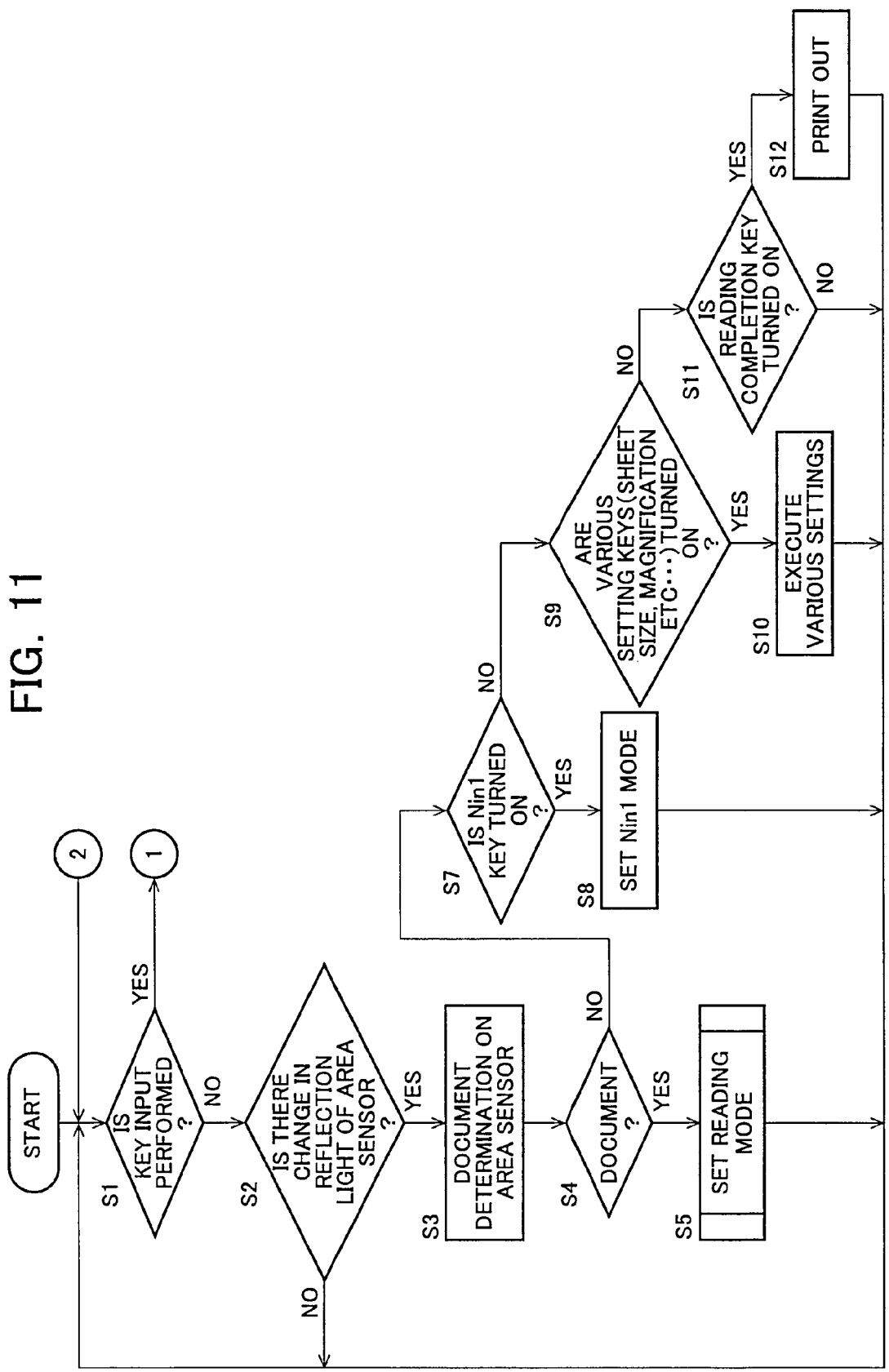
FIG. 11 is a flowchart illustrating an example of processing by a control portion included in the document reading apparatus of the present invention.
Figure 12:
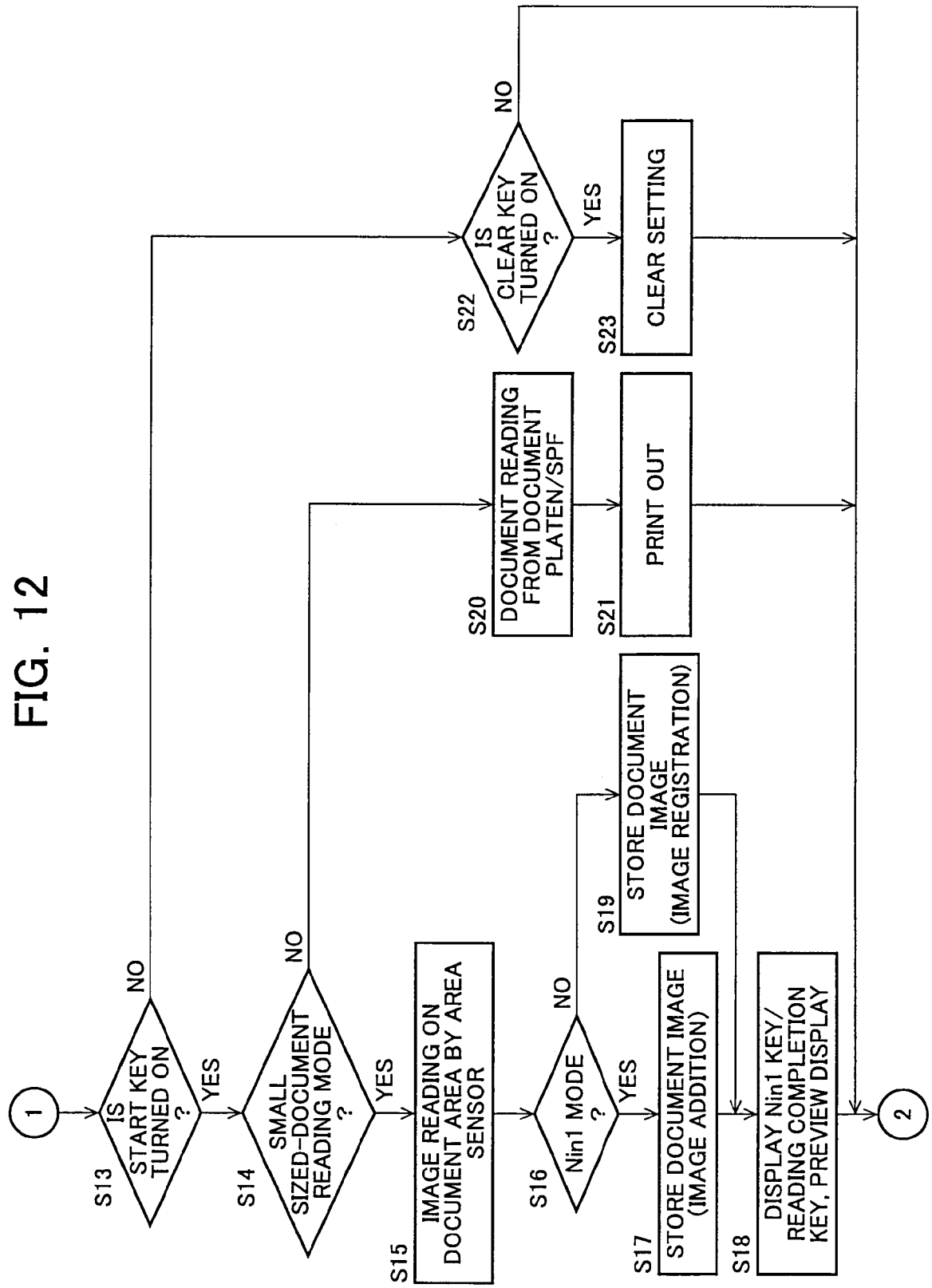
FIG. 12 is a flowchart, subsequent to FIG. 11, illustrating an example of processing by the control portion included in the document reading apparatus of the present invention.
Figure 13:
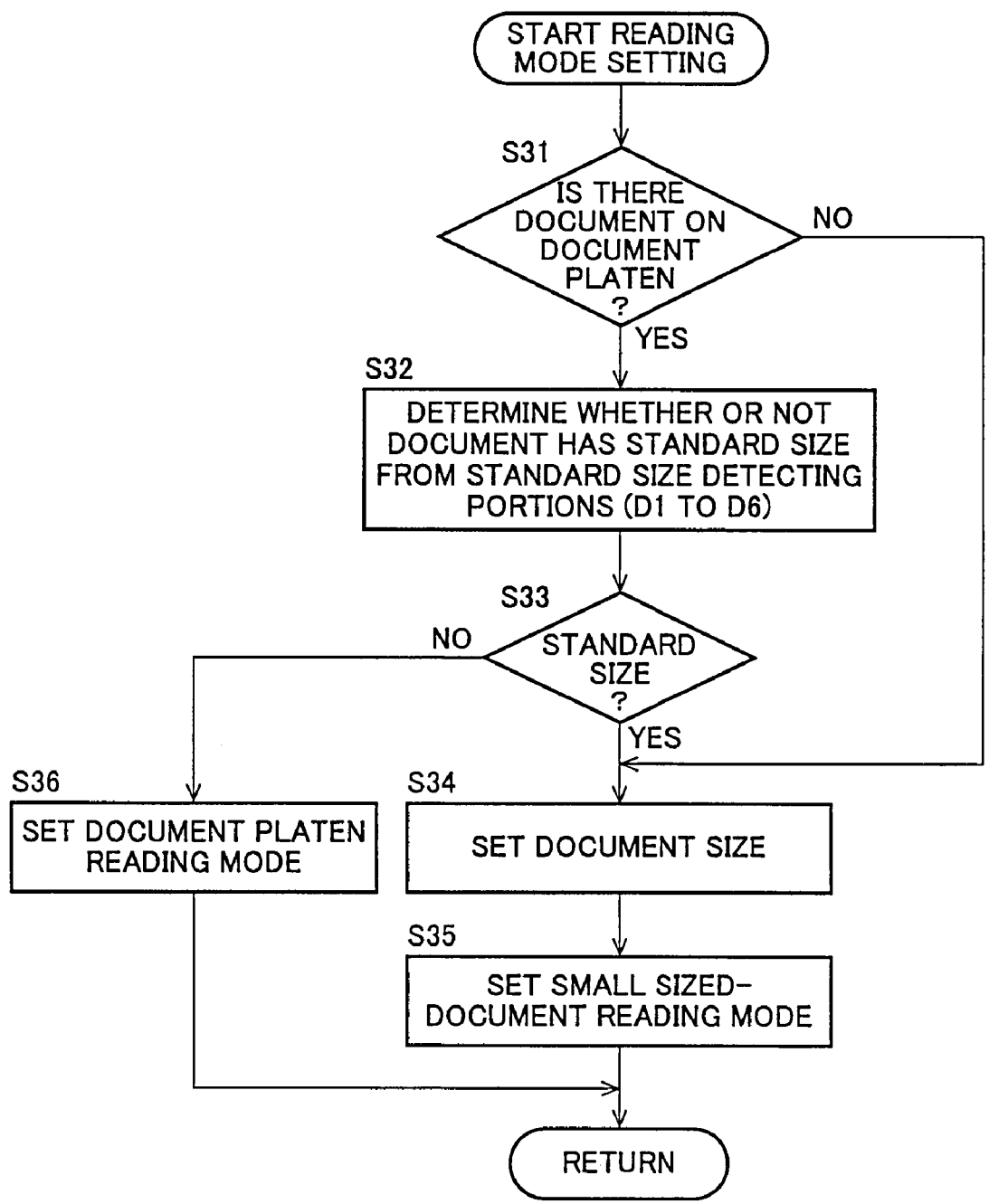
FIG. 13 is a flowchart illustrating an example of processing by the control portion included in the document reading apparatus of the present invention, which illustrates an example of a part of the processing in FIG. 11.

Next, description will be given for a processing example in the image forming apparatus provided with the document reading apparatus with the structure above, referring to FIGS. 11 to 13. FIGS. 11 to 13 are flowcharts illustrating an example of processing by the control portion (main CPU 101) included in the document reading apparatus of the present invention. Here, FIG. 12 is a flowchart subsequent to FIG. 11 and FIG. 13 is a flowchart illustrating an example of a part of the processing (reading mode processing) in FIG. 11.

In FIG. 11, first, the main CPU 110 determines the presence of key input to the key switch portion 402 (step S1). When key input is performed (in the case of YES at step S1), the procedure proceeds to step S13 in FIG. 12. Alternatively, when no key input is performed (in the case of NO at step S1), whether or not any of light receiving elements of the area sensor portion 401b detects change in reflection light is determined (step S2). Here, when there is change in output of the reflection light, it is determined that an object such as a document is placed or a touch operation is made. Then, the light receiving element in which the reflection light is changed may be detected so that the touch operation can be detected even in a state where a document is placed. When the change in the reflection light is detected (in the case of YES at step S2), whether or not a document is placed on the area sensor portion 401b is determined based on whether or not reflection light is on the small-sized document reading area on the area sensor portion 401b (step S3). Alternatively, no change in the reflection light is detected (in the case of NO at step S2), the procedure returns to step S1 to repeat the processing.

When it is determined that a document is placed on the area sensor portion 401b based on the determination result at step S3 (in the case of YES at step S4), the main CPU 101 moves to a routine of "reading mode setting" described below to execute setting (step S5).

Alternatively, when it is determined that no document is placed on the area sensor portion 401b based on the determination result at step S3 (in the case of NO at step S4), the main CPU 101 determines it as a touch operation and determines whether or not a center position between the maximum values and the minimum values of X coordinate and Y coordinate (X max, Y max, X min, and Y min) of the light receiving element in which the reflection light is changed is included in a display area of the N in 1 key (step S7). Here, when the center position between the maximum values and the minimum values of X coordinate and Y coordinate is included in the display area of the N in 1 key (in the case of YES at step S7), it switches to the N in 1 mode (step S8).

Alternatively, when the center position between the maximum values and the minimum values of X coordinate and Y coordinate is not included in the display area of the N in 1 key (in the case of NO at step S7), it is determined whether or not the center position between maximum values and minimum values of X coordinate and Y coordinate (X max, Y max, X min, and Y min) is included in display areas of various setting keys (sheet size, magnification, and the like) (step S9). Here, when the center position between maximum values and minimum values of X coordinate and Y coordinate is included in the display areas of various setting keys (in the case of YES at step S9), various settings are performed (step S10).

Alternatively, when the center position between the maximum value and the minimum value of X coordinate and Y coordinate is not included in the display areas of various setting keys (in the case of NO at step S9), it is determined whether or not the center position between the maximum values and the minimum values of X coordinate and Y coordinate (X max, Y max, X min, and Y min) is included in a display area of the reading completion key (step S11). Here, when the center position between the maximum values and the minimum values of X coordinate and Y coordinate is included in the display area of the reading completion key (in the case of YES at step S11), a stored document image is printed out in accordance with the setting mode (step S12). Alternatively, when the center position between the maximum values and the minimum values of X coordinate and Y coordinate is not included in the display area of the reading completion key (in the case of NO at step S11), the procedure returns to step S1 to repeat the processing.

In FIG. 12, in the case of YES at step S1 shown in FIG. 11 (when there is key input), the main CPU 101 determines whether or not the start key is turned ON (step S13). When it is determined that the start key is turned ON (in the case of YES at step S13), whether or not in the "small-sized document reading mode" is determined (step S14). When it is determined as the "small-sized document reading mode" (in the case of YES at step S14), a document in the document area set by the "reading mode setting" below (step S5) is read by the area sensor portion 401b to store the read document image (step S15).

Subsequently, the main CPU 101 determines whether or not the N in 1 mode is set (step S16), and when the N in 1 mode is set (in the case of YES at step S16), the document image read by the area sensor portion 401b is stored as an additional page to previously stored document images (step S17). Then, display of the N in 1 key 415 and the reading completion key 416 is made as well as read image data and an image of the output state (preview) when printed based on the setting mode are generated to be displayed (step S 18). For example, in the case of the N in 1 mode, the total number of read document images is set as N number (document pages) in N in 1, and all document images are collected on one sheet, followed by displaying collected image for preview.

Alternatively, when the N in 1 mode is not set (in the case of NO at step S16), the document image read by the area sensor portion 401b is stored (step S19) and the procedure is shifted to step S18. Note that, in this case, it is not in the N in 1 mode, and therefore when there is a document image stored already, the stored document image is cleared. Then, the procedure returns to step S1 of FIG. 11 to repeat the processing.

In addition, in a case where the main CPU 101 determines that it is not in the "small-sized document reading mode" (in the case of NO at step S14), when it is detected by a document sensor (not shown) that a document is placed on the automatic document feeder (SPF) 120, the main CPU 101 performs conveyance and reading of the document using the automatic document feeder 120, alternatively, when it is not detected by the document sensor, the main CPU 101 performs reading of the document on the document platen 92 (step S20). Then, the read document image is printed out (step S21), and the procedure returns to step S1 to repeat the processing.

In addition, when the main CPU 101 determines that the start key is not turned ON (in the case of NO at step S13), the main CPU 101 determines whether or not the clear key is turned ON (step S22), and when it determines that the clear key is turned ON (in the case of YES at step S22), it clears the setting (step S23). Alternatively, when it is determined that the clear key is not turned ON (in the case of NO at step S22), the procedure returns to step S1 of FIG. 11 to repeat the processing.

Note that, in the flowchart above, although the processing is performed so that confirmation input for confirming the N in 1 is accepted, front and rear sides of a driver's license and the like are often composed in a sheet, thus, in a case where the N in 1 mode is frequently used, the N in 1 mode may be previously set in the case of the small-sized document reading mode.

Referring to FIG. 13, the reading mode setting at step S5 of FIG. 11 will be described. First, when it is determined that a document is placed on the small sized-document reading area by reflection light received by the area sensor portion 401b (in the case of YES at step S4 of FIG. 11), the main CPU 101 determines whether or not a document is on the document platen 92 (step S31). Whether or not a document is on the document platen 92 may be determined based on output result from well-known document size detecting means (reflection type or transmission type), or based on whether or not any image is obtained on output of the light quantity sensor 301b after reading to scan the document platen 92 in the document reading portion 300.

When a document is on the document platen 92 (in the case of YES at step S31), as illustrated referring to FIG. 10, the main CPU 101 determines whether or not the document has a standard size based on the detection result from the standard size detecting portion (step S32). When the size is a standard size (in the case of YES at step S33), the main CPU 101 sets the document size as any of S, M and L based on the determination at step S32 to thereby set the area having the document placed thereon (document area) as a document reading area (step S34). Subsequent to step S34, the main CPU 101 sets the "small sized-document reading mode" (step S35). At step S35, display on the display screen is changed as shown in FIG. 9A.

Alternatively, in the case of a non-standard size (in the case of NO at step S33), since the document on the area sensor portion 401b has a non-standard size, the main CPU 101 sets a document platen reading mode (step S36), returns the procedure back to step S1 to eventually control the document reading portion 300 so that the document is read from the document platen 92 at step S20 after NO is determined at step S14.

Alternatively, when there is no document on the document platen 92 (in the case of NO at step S31), the main CPU 101 proceeds to step S34 without performing determination of whether or not a standard size, and even when the area shown by the detection result from the standard size detecting portion (the document area detected by the area sensor portion 401b) is non-standard, it sets the area as the document reading area, and proceeds to step S35.

Figure 14:
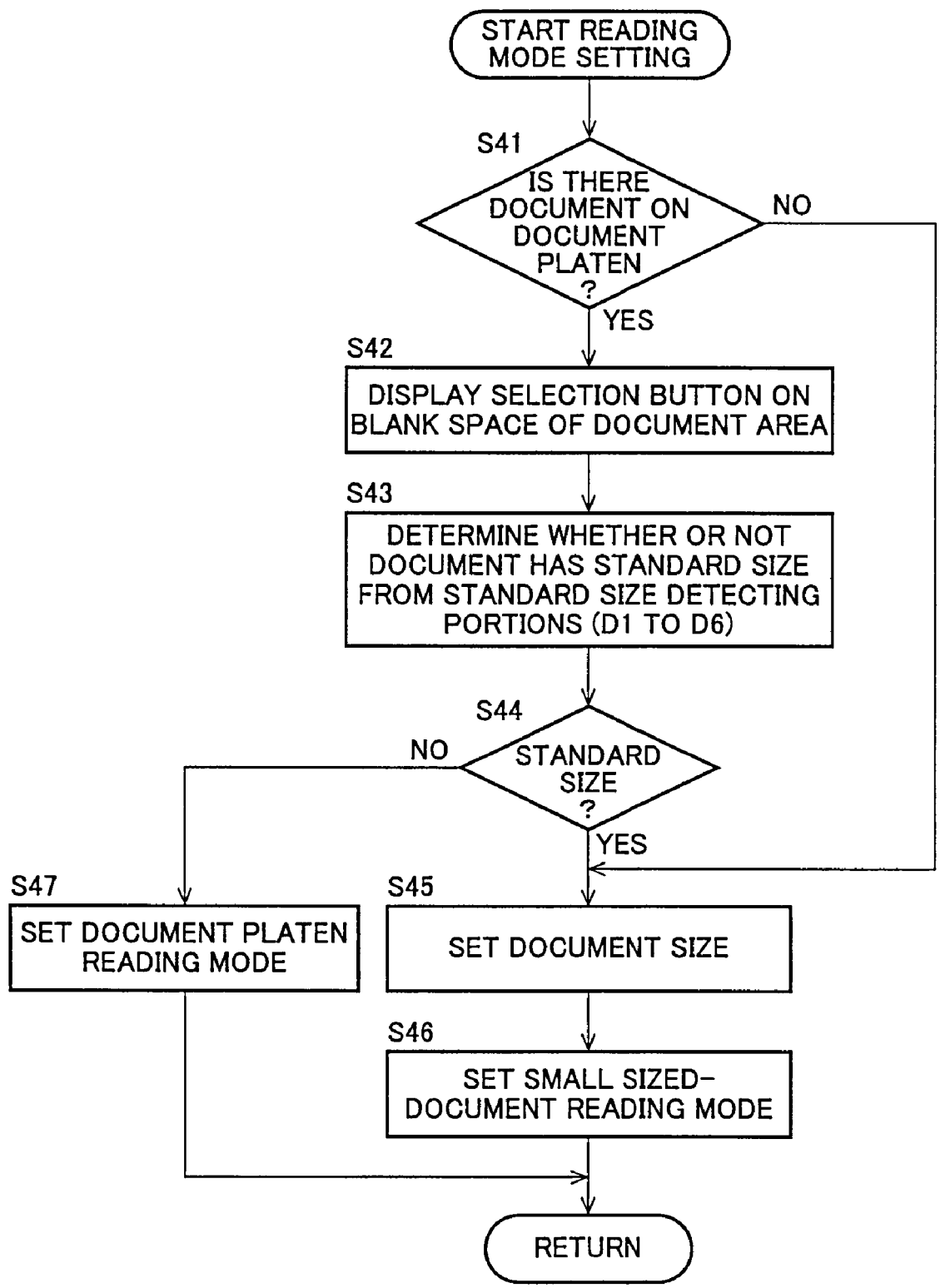
FIG. 14 is a flowchart illustrating another example of processing by the control portion included in the document reading apparatus of the present invention, which illustrates another example of a part of the processing in FIG. 11.

In the above, although description has been given for the processing example in the image forming apparatus referring to FIGS. 11 to 13, following processing may be employed instead of an example of the reading mode processing illustrated in FIG. 13. An example of the processing will be described referring to FIG. 14. FIG. 14 is a flowchart illustrating another example of processing by the control portion (main CPU 101) included in the document reading apparatus of the present invention, which illustrates a different example of reading mode processing from the processing example of FIG. 13.

The reading mode setting described here is to execute processing for displaying a selection button (forced selection button) on a blank space of the document area (step S42) before proceeding to step S43 corresponding to step S32 of FIG. 13 in the case of YES at step S41 corresponding to step S31 of FIG. 13. Steps S44 to S47 correspond to steps S33 to S36 in FIG. 13, respectively, and description of steps S41 and S43 will be omitted.

At step S42, the main CPU 101 controls the display portion 401a to display the forcible selection button for causing a user to select whether to forcibly select (turn ON) the small-sized document mode or to select the document platen document mode in an area other than the document area (area having the document placed thereon) of the display portion 401a. Then, in a state where the forcible selection button is displayed, when the area sensor portion 401b serving concurrently as the touch panel detects that the forcible selection button is pressed (corresponding to the case of YES at step S9 of FIG. 11), the small-sized document reading mode may be set (corresponding to step S10 of FIG. 11).

As has been described in step S42 and the processing after the display processing, when documents are placed on both of the display screen of the display portion 401a and the document platen 92, the main CPU 101 preferably has a selecting portion for selecting that reading is performed for which document, based on a user operation. Thereby, when documents are placed on both of the document platen 92 and the display screen of the display portion 401a, it is possible to prevent the mistake of reading the document unintended by a user.

The selecting portion displays a reading key on a blank area of the display portion 401a capable of performing an operation from the touch panel (simply meaning "the blank area of the display portion 401a" when the touch panel is provided over the entire display portion 401a like in the present example), and when a user operates the displayed reading key, reading of the document on the display screen is preferably executed by the area sensor portion 401b. Although the reading key may be a key like the start operation image additionally described referring to FIG. 9A, when objects such as a document are detected on both of the document platen 92 and the display screen, at least display thereof is executed in this example. As a result, the reading key is displayed on the touch panel for executing reading of the document placed on the display screen and therefore easily comes into the user's sight, thus making it possible to perform the operation without fail.

In the above, although description has been given for the two processing examples in the image forming apparatus referring to FIGS. 11 to 14, it is also possible to perform another processing as follows in document reading from the document platen/SPF (for example, step S20 of FIG. 12).

Description will be given partly referring to FIG. 13 or FIG. 14. When it has been determined that a document is on the display screen of the display portion 401a and a document is also on the document platen 92 (in the case of YES at steps S31/S41), that is, when the small-sized document reading mode is set at steps S35/S46, the main CPU 101 determines whether or not a document is on the automatic document feeder 120. Then, when no document is on the automatic document feeder 120, the main CPU 101 may execute the processing as has been described above, whereas, when a document is thereon, releases the small-sized document reading mode and sets the document platen reading mode.

In this way, when concurrently detecting documents on the automatic document feeder 120, the document platen 92, and the display portion 401a, the main CPU 101 preferably performs control of reading of an image of the document on the document platen 92 by the document reading portion 300. Thereby, it is possible to prevent the automatic document feeder 120 from being started to read the original image in a state where the document is placed on the document platen 92. Moreover, in combination with the control, with respect to the image read by the document reading portion 300 from the document platen 92, the image forming portion 200 and the like can be also controlled to switch so that the image is copied.

According to the present invention, the following effect can be obtained.

According to the present invention, in the document reading apparatus for reading an image of a document placed on the document platen, by reading an image of a document on the display screen of the display portion using the area sensor, in addition to reading of an image on a document platen, it is not necessary to set a document for reading on the document platen so that the document is prevented from being left behind, and even when a document is placed on the document platen and the document sticks out of the document platen to extend over the display screen, it is possible to prevent the document on the display portion from being erroneously read.

The invention claimed is:

1. A document reading apparatus, comprising:
   a document reading portion for reading an image of a document placed on a document platen;
   a first detecting sensor for detecting that a document is on the document platen;
   a display portion disposed next to the document platen and having an area sensor for reading an image of a small-sized document placed on a display screen and detecting that a document is on the display screen; and
   a control portion for performing control, when detecting that a document is on the document platen or on the display screen by the first detecting sensor and the area sensor, for reading an image of the document by the document reading portion or the area sensor, wherein
   when detecting that the document is on the document platen by the first sensor and detecting that the document is on the display screen by the area sensor, detecting whether or not the document is a standard size by a part of the area sensor or by a sensor for detecting a standard size provided separately from the area sensor, and detecting that the document is not a standard size, the control portion performs control so that the document reading portion performs reading of the image of the document on the document platen and the area sensor is prohibited from reading the image of the document.

2. The document reading apparatus as defined in claim 1, wherein
the display portion performs display showing an area on the display screen, on which a document of the standard size is to be placed, and the part of the area sensor or the sensor for detecting a standard size is arranged on the position corresponding to the standard size in the area.

3. The document reading apparatus as defined in claim 1, wherein
the control portion further has a selecting portion for selecting, when detecting that documents are placed on both of the display screen and the document platen by the first detecting sensor and the area sensor, the document for which reading is to be performed, based on a user operation.

4. The document reading apparatus as defined in claim 3, wherein
the display portion has a touch panel, and the selecting portion displays a reading key on a blank area of the display portion capable of performing an operation with the touch panel and performs reading of the document on the display screen when the displayed reading key is operated by a user.

5. The document reading apparatus as defined in claim 1, wherein
the display portion displays preview of the image of the document read by control at the control portion.

6. The document reading apparatus as defined in claim 1, comprising an automatic document feeder for feeding a document onto the document platen, and a second detecting sensor for detecting that a document is on the automatic document feeder, wherein
when detecting documents on all of the automatic document feeder, the document platen, and the display screen by the second detecting sensor, the first detecting sensor and the area sensor, the control portion performs control for reading the image of the document on the document platen.

7. An image forming apparatus comprising the document reading apparatus as defined in claim 1.

8. The document reading apparatus as defined in claim 1, wherein the first detecting sensor is provided separately from the document reading portion or the document reading portion doubles as the first detecting sensor.

* * * * *